US012681678B2

(12) United States Patent
Han et al.

(10) Patent No.: US 12,681,678 B2
(45) Date of Patent: Jul. 14, 2026

(54) ELECTRONIC DEVICE AND METHOD FOR CONTROLLING ELECTRONIC DEVICE

(71) Applicant: SAMSUNG ELECTRONICS CO., LTD., Suwon-si (KR)

(72) Inventors: Sangjin Han, Suwon-si (KR); Yonghwan Kwon, Suwon-si (KR); Hyeonji Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/080,042

(22) Filed: Mar. 14, 2025

(65) Prior Publication Data

US 2025/0278234 A1 Sep. 4, 2025

Related U.S. Application Data

(63) Continuation of application No. PCT/KR2023/010958, filed on Jul. 27, 2023.

(30) Foreign Application Priority Data

Sep. 21, 2022 (KR) ........................ 10-2022-0119529
Dec. 21, 2022 (KR) ........................ 10-2022-0180607

(51) Int. Cl.
*G06F 3/147* (2006.01)
(52) U.S. Cl.
CPC .................................... *G06F 3/147* (2013.01)
(58) Field of Classification Search
CPC ....... G06F 3/147; G06F 3/14; H04L 43/0805; H04N 21/422; H04N 21/42204;
(Continued)

(56) References Cited

U.S. PATENT DOCUMENTS 10,021,336 B2 7/2018 Heo et al.
10,459,738 B2 10/2019 Seo et al.
(Continued)

FOREIGN PATENT DOCUMENTS

EP 2 966 873 A1 1/2016
JP 2021-184652 12/2021
(Continued)

OTHER PUBLICATIONS

International Search Report issued on Nov. 6, 2023 for International Application No. PCT/KR2023/010958.
(Continued)

*Primary Examiner* — Dmitriy Bolotin
(74) *Attorney, Agent, or Firm* — STAAS & HALSEY LLP

(57) ABSTRACT

An electronic device comprising a display; a plurality of communication interfaces, which connect, to the electronic device, at least one external device to provide content and at least one input device to receive a user input; a memory to store mapping information indicating the mapping relationship between the at least one external device and the at least one input device; and a processor which, based on a signal according to an operation of a first input device being received from the first input device through a first communication interface from among the plurality of communication interfaces, identifies, based on the mapping information, the at least one external device as corresponding to the first input device, receives an image signal from the at least one external device through a second communication interface, and controls the display such that content corresponding to the image signal is displayed.

15 Claims, 16 Drawing Sheets

(58) Field of Classification Search
CPC ....... H04N 21/43615; H04N 21/44227; H04N 21/443; H04N 21/4432; H04N 21/485
See application file for complete search history.

(56) References Cited

U.S. PATENT DOCUMENTS

| | | | |
|---|---|---|---|
| 10,742,922 B2 | 8/2020 | Kim | |
| 11,011,054 B2 | 5/2021 | Kim et al. | |
| 11,930,238 B2 | 3/2024 | Baek | |
| 2005/0166241 A1* | 7/2005 | Kim | H04N 21/4108 |
| | | | 725/78 |
| 2014/0157326 A1* | 6/2014 | Ida | H04N 21/482 |
| | | | 725/59 |
| 2016/0006971 A1 | 1/2016 | Yum | |
| 2016/0011776 A1* | 1/2016 | Song | G06F 9/451 |
| | | | 345/156 |
| 2016/0301970 A1* | 10/2016 | Kim | G06F 3/0482 |
| 2017/0118089 A1* | 4/2017 | Hur | H04W 52/0283 |
| 2017/0311025 A1* | 10/2017 | Kim | G06F 3/1454 |
| 2017/0366778 A1 | 12/2017 | Kim et al. | |
| 2018/0098018 A1* | 4/2018 | Cho | H04N 21/4316 |
| 2019/0149871 A1* | 5/2019 | Yoshizawa | H04N 21/436 |
| | | | 348/734 |
| 2019/0268652 A1* | 8/2019 | Choi | H04N 21/4622 |
| 2021/0084366 A1 | 3/2021 | Yun et al. | |
| 2022/0172603 A1* | 6/2022 | Hatambeiki | |
| 2023/0169910 A1* | 6/2023 | Kim | G06F 3/1438 |
| | | | 345/1.1 |
| 2025/0133256 A1* | 4/2025 | Cho | H04N 21/4312 |

FOREIGN PATENT DOCUMENTS

| | | |
|---|---|---|
| JP | 2022-38276 | 3/2022 |
| KR | 10-0619413 | 9/2006 |
| KR | 10-2015-0066917 | 6/2015 |
| KR | 10-2016-0003400 | 1/2016 |
| KR | 10-2016-0006545 | 1/2016 |
| KR | 10-2017-0006096 | 1/2017 |
| KR | 10-2017-0048993 | 5/2017 |
| KR | 10-2018-0057127 | 5/2018 |
| KR | 10-2019-0041067 | 4/2019 |
| KR | 10-2020-0005132 | 1/2020 |
| KR | 2002-0030572 | 4/2022 |
| KR | 10-2022-0086599 | 6/2022 |

OTHER PUBLICATIONS

Written Opinion issued on Nov. 6, 2023 for International Application No. PCT/KR2023/010958.
Partial Supplementary European Search Report issued Oct. 30, 2025 for Application No. 23868366.8.
Supplementary European Search Report issued Jan. 23, 2026 for Application No. 23868366.8.

* cited by examiner

100

100

100

100

ELECTRONIC DEVICE AND METHOD FOR CONTROLLING ELECTRONIC DEVICE

CROSS-REFERENCE TO RELATED APPLICATION

This application is a continuation application, under 35 U.S.C. § 111(a), of international application No. PCT/KR2023/010958, filed Jul. 27, 2023, which claims priority under 35 U. S. C. § 119 to Korean Patent Application No. 10-2022-0119529, filed on Sep. 21, 2022, and Korean Patent Application No. 10-2022-0180607, filed Dec. 21, 2022, the disclosures of which are incorporated herein by reference in their entireties.

TECHNICAL FIELD

The present disclosure relates to an electronic device and a method for controlling an electronic device, and more particularly, to an electronic device capable of changing an external device for providing content displayed on a display of the electronic device, and a method for controlling an electronic device.

BACKGROUND ART

Recently, various types of external devices (source devices) for providing content may be connected to an electronic device such as a television (TV) or a monitor to thus provide a user with various types of content. In detail, the various external devices such as a set-top box, a personal computer (PC), a console game machine, a digital versatile disc (DVD) player, and an external hard disk may be connected to the electronic device such as a TV or a monitor. In addition, various types of input devices related to the external device, such as a mouse, a PC, an electronic fan, a game pad, and a remote control may be used by being connected to the electronic device.

Therefore, the user may need to select which external device, among the various external devices connected to the electronic device, the user wants to use to receive the content, and also to select which input device, among the various input devices, the user wants to use to perform user manipulation related to the corresponding content, which may cause inconvenience to the user.

Accordingly, a conventional technology has automatically performed switching to a screen corresponding to a corresponding external device to display the content received from the external device if power of the external device connected to the electronic device is powered on. However, this conventional technology is unable to perform the switching to the screen corresponding to the external device if the external device is already powered on. In addition, the conventional technology is unable to automatically perform the switching to the screen corresponding to the external device except by the user directly powering on the external device while the external device is powered off. In addition, the conventional technology has difficulty in effectively identifying which device, among the electronic device or the external device, is to be controlled through the input device, and in controlling the corresponding device if some components of the electronic device or the external device connected to the electronic device are operated in a sleep state in which the corresponding components are disabled.

DISCLOSURE

Technical Solution

The present disclosure provides an electronic device capable of changing an external device for providing content displayed on a display of the electronic device, particularly based on manipulation of an input device connected to the electronic device, and a method for controlling an electronic device.

According to an embodiment of the present disclosure, provided is an electronic device including: a display; a plurality of communication interfaces configured to connect at least one external device to provide content and at least one input device to receive a user input to the electronic device; a memory to store mapping information indicating a mapping relationship between the at least one external device and the at least one input device; and a processor configured to identify the at least one external device as corresponding to a first input device among the at least one input device based on the mapping information which is stored in the memory according to a signal caused by a manipulation of the first input device being received from the first input device through a first communication interface among the plurality of communication interfaces, receive an image signal from the at least one external device through a second communication interface among the plurality of communication interfaces, and control the display to display content corresponding to the image signal.

The processor may be configured to identify whether the first external device is powered on, receive the image signal from the first external device through the second communication interface among the plurality of communication interfaces based on the first external device being identified as being powered on, control the second communication interface to transmit a control signal to power on the first external device to the first external device based on the first external device being identified as being powered off, and receive the image signal from the first external device through the second communication interface based on the first external device being powered on based on the control signal.

The processor may be configured to execute a first application predetermined to correspond to the first external device among a plurality of applications provided by the electronic device based on the first external device not being powered on based on the control signal, and control the display to display a screen corresponding to the first application.

The processor may be configured to control the display to display the screen corresponding to the first application based on the first external device is identified as not being connected to the electronic device.

The content corresponding to the image signal the display is controlled to display may be first content and the processor may be configured to control the display to display a first user interface to stop display of second content and select whether to display the first content based on the signal caused by the manipulation of the first input device being received while the second content provided from the second external device among the at least one external device is displayed on the display, and control the display to display the first content based on the user input to stop the display of the second content and select to display the first content is received through the first user interface.

Wherein the processor may be configured to identify whether the signal caused by the manipulation of the first input device is received again from the first input device within a predetermined first threshold interval after the signal caused by the manipulation of the first input device is received, control the display to display the first content based on the signal caused by the manipulation of the first input device is received again within the first threshold interval, and maintain an operation of the display based on the signal caused by the manipulation of the first input device is not received again within the first threshold interval.

The processor may be configured to identify whether a received signal is the image signal based on the signal is received from the third external device among the at least one external device through the third communication interface among the plurality of communication interfaces while the first content is displayed on the display, control the display to display the second content corresponding to the received signal based on the received signal is the image signal, and maintain an operation of the display based on the received signal is not the image signal.

The mapping information may be acquired on the basis of at least one of a user setting or a history of signal reception from the at least one input device within a threshold time after a signal is received from the at least one external device.

The processor may be configured to control at least one communication interface among the plurality of communication interfaces to transmit a control signal for powering off the at least one external device connected to the electronic device to each of the at least one external device based on the user input for powering off the electronic device is received.

The processor may be configured to control the display to stop an operation of the display based on the first signal corresponding to the user input for powering off the electronic device is received from the second input device among the at least one input device through the fourth communication interface among the plurality of communication interfaces while the first content is displayed, control the fourth communication interface to maintain an activation state of the fourth communication interface while the operation of the display is stopped, and control the display to display the first content based on a second signal caused by a manipulation of the second input device is received from the second input device through the fourth communication interface while the operation of the display is stopped.

The processor may be configured to control the fifth communication interface among the plurality of communication interfaces to transmit a third signal to the fourth external device for a predetermined second threshold interval based on the third signal caused by the manipulation of the second input device is received from the second input device through the fourth communication interface while the fourth external device among the at least one external device is operated in a sleep state, receive a first image signal from the fourth external device through the fifth communication interface, and control the display to display third content corresponding to the first image signal based on the sleep state of the fourth external device is changed to its activation state within the second threshold interval, control the display to display the first content based on the sleep state of the fourth external device is not changed to the activation state within the second threshold interval, and control an operation of the electronic device on the basis of a fourth signal based on the fourth signal caused by the manipulation of the second input device is received from the second input device through the fourth communication interface after the second threshold interval.

The processor may be configured to control the display to display the first content while the third signal is transmitted to the fourth external device.

The processor may be configured to control the display to display a second user interface including an item for changing a sleep state of the fourth external device to the activation state based on a third signal caused by the manipulation of the second input device is received from the second input device through the fourth communication interface while the fourth external device is operated in the sleep state, control the fifth communication interface among the plurality of communication interfaces to transmit the third signal to the fourth external device for a predetermined second threshold interval based on the item is selected through the fourth communication interface on the basis of a fifth signal received from the second input device, and receive a first image signal from the fourth external device through the fifth communication interface, and control the display to display third content corresponding to the first image signal based on the sleep state of the fourth external device is changed to the activation state within the second threshold interval.

The processor may be configured to control the display to display the second user interface based on the sleep state of the fourth external device is not changed to the activation state within the second threshold interval, and control an operation of the electronic device on the basis of a fourth signal based on the fourth signal caused by the manipulation of the second input device is received from the second input device through the fourth communication interface after the second threshold interval.

According to an embodiment of the present disclosure, provided is a method for controlling an electronic device, the method including: identifying at least one external device as corresponding to at least one input device based on mapping information indicating a mapping relationship between the at least one external device to provide content and the at least one input device based on a signal caused by a manipulation of the at least one input device being received from the at least one input device; receiving an image signal from the at least one external device; and displaying content corresponding to the image signal.

The method may further include: identifying whether the first external device is powered on; receiving the image signal from the first external device based on the first external device is identified as being powered on; transmitting a control signal for powering on the first external device to the first external device based on the first external device is identified as being powered off; and receiving the image signal from the first external device based on the first external device is powered on based on the control signal.

The method may further include: executing a first application predetermined to correspond to the first external device among the plurality of applications provided by the electronic device based on the first external device is not powered on based on the control signal; and controlling the display to display a screen corresponding to the first application.

The method may further include displaying the screen corresponding to the first application based on the first external device is identified as not being connected to the electronic device.

The method may further include: displaying a first user interface for stopping display of second content and selecting whether to display the first content based on the signal caused by the manipulation of the first input device is received while the second content provided from the second external device among the at least one external device is displayed on the display; and displaying the first content based on the user input for stopping the display of the second content and selecting to display the first content is received through the first user interface.

The method may further include: identifying whether the signal caused by the manipulation of the first input device is received again from the first input device within a predetermined first threshold interval after the signal caused by the manipulation of the first input device is received; displaying the first content based on the signal caused by the manipulation of the first input device is received again within the first threshold interval; and maintain an operation of the display based on the signal caused by the manipulation of the first input device is not received again within the first threshold interval.

The method may further include: identifying whether a received signal is the image signal based on the signal is received from the third external device among the at least one external device through the third communication interface among the plurality of communication interfaces while the first content is displayed on the display; displaying the second content corresponding to the received signal based on the received signal is the image signal; and maintaining an operation of the display based on the received signal is not the image signal.

The mapping information may be acquired on the basis of at least one of a user setting or a history of signal reception from at least one input device within a threshold time after a signal is received from at least one external device.

The method may further include transmitting a control signal for powering off the at least one external device connected to the electronic device to each of the at least one external device based on the user input for powering off the electronic device is received.

According to an embodiment of the present disclosure, provided is a non-transitory computer-readable recording medium including a program for executing a method for controlling an electronic device, wherein the method includes identifying at least one external device as corresponding to at least one input device based on mapping information indicating a mapping relationship between the at least one external device to provide content and the at least one input device based on a signal caused by a manipulation of the first input device is received from the first input device among the at least one input device to receive a user input to the electronic device, the identifying being based on, receiving an image signal from the first external device, and displaying first content corresponding to the image signal.

BEST MODE

Figure 1:
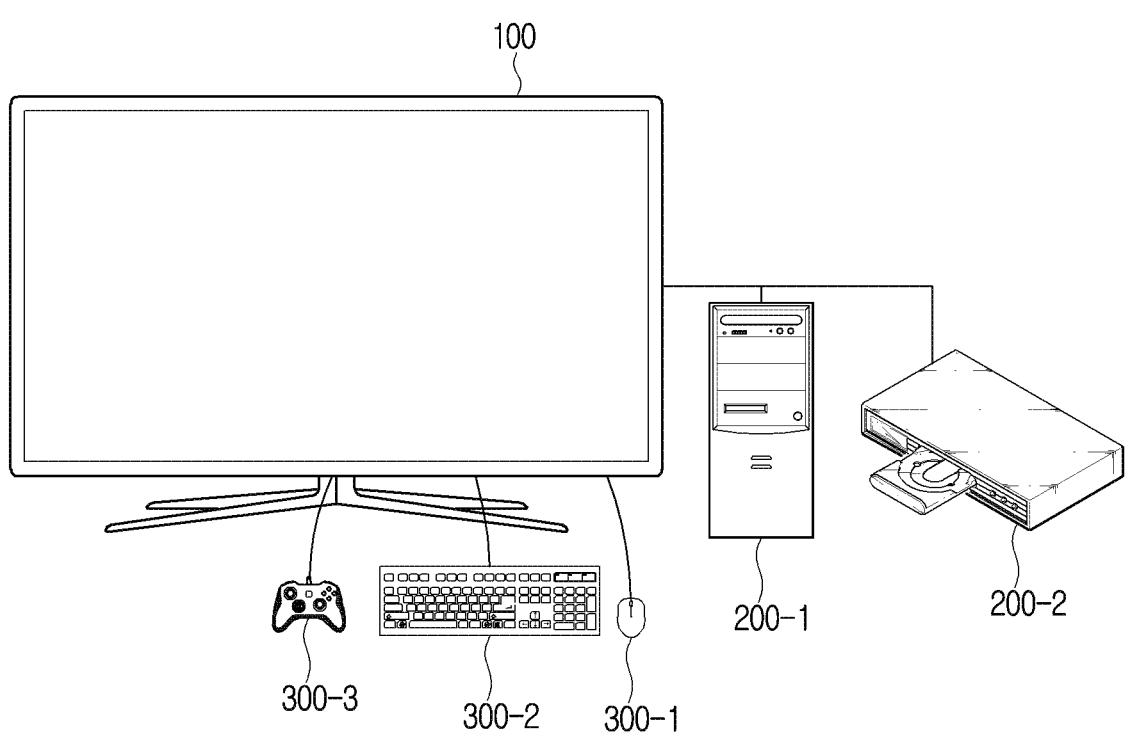
FIG. 1 is a diagram showing an electronic device, an external device, and an input device according to an embodiment of the present disclosure.

The present disclosure may be variously modified and have several embodiments, and specific embodiments of the present disclosure are thus shown in the drawings and described in detail in the detailed description. However, it should be understood that the scope of the present disclosure is not limited to the specific embodiments, and includes various modifications, equivalents, and/or alternatives according to the embodiments of the present disclosure. Throughout the accompanying drawings, similar components are denoted by similar reference numerals.

In describing the present disclosure, omitted is a detailed description of a case where it is decided that the detailed description of the known functions or configurations related to the present disclosure may unnecessarily obscure the gist of the present disclosure.

In addition, the following embodiments may be modified in several different forms, and the scope and spirit of the present disclosure are not limited to the following embodiments. Rather, these embodiments are provided to make the present disclosure thorough and complete, and completely convey the spirit of the present disclosure to those skilled in the art.

Terms used in the present disclosure are used only to describe the specific embodiments rather than limiting the scope of the present disclosure. Here, a term of a singular number includes its plural number unless explicitly interpreted otherwise in the context.

In the present disclosure, an expression "have", "may have", "include", "may include" or the like, indicates the presence of a corresponding feature (for example, a numerical value, a function, an operation, or a component such as a part), and does not exclude the presence of an additional feature.

In the present disclosure, an expression "A or B", "at least one of A and/or B", "one or more of A and/or B" or the like, may include all possible combinations of items enumerated together. For example, "A or B", "at least one of A and B" or "at least one of A or B" may indicates all of 1) a case where at least one A is included, 2) a case where at least one B is included, or 3) a case where both of at least one A and at least one B are included.

The expressions "first", "second" and the like used in the present disclosure may indicate various components regardless of a sequence and/or importance of the components. These expressions are only used in order to distinguish one component and another component from each other, and do not limit the corresponding components.

If any component (for example, a first component) is mentioned to be "(operatively or communicatively) coupled with/to" or "connected to" another component (for example, a second component), it should be understood that the any component is directly coupled to another component or may be coupled to another component through still another component (for example, a third component).

On the other hand, if any component (for example, the first component) is mentioned to be "directly coupled" or "directly connected to" another component (for example, the second component), it should understood that still another component (for example, the third component) is not present between any component and another component.

An expression "configured (or set) to" used in the present disclosure may be replaced by an expression "suitable for", "having the capacity to", "designed to", "adapted to", "made to", or "capable of" based on a situation. The expression "configured (or set) to" may not necessarily indicate "specifically designed to" in hardware.

Rather, an expression "a device configured to" in some contexts may indicate that the device may "perform~" together with another device or component. For example, "a processor configured (or set) to perform A, B and C" may indicate a dedicated processor (for example, an embedded processor) that performs a corresponding operation or a generic-purpose processor (for example, a central processing unit (CPU) or an application processor) that performs the corresponding operation by executing at least one software program stored in a memory device.

In the embodiments, a "module" or a "~er/or" may perform at least one function or operation, and be implemented by hardware, software, or a combination of hardware and software. In addition, a plurality of "modules" or a plurality of "~ers/ors" may be integrated with each other in at least one module and implemented by at least one processor except for a "module" or an "~er/or" that needs to be implemented in specific hardware.

Meanwhile, various elements and regions in the drawings are schematically shown. Therefore, the spirit of the present disclosure is not limited to relative sizes or intervals shown in the accompanying drawings.

Hereinafter, the embodiments of the present disclosure are described in detail with reference to the accompanying drawings so that those skilled in the art to which the present disclosure pertains may easily practice the present disclosure.

FIG. 1 is a diagram showing an electronic device 100, an external device 200, and an input device 300 according to an embodiment of the present disclosure.

As shown in FIG. 1, a system for implementing various embodiments according to the present disclosure may include the electronic device 100, the external device 200, and the input device 300. FIG. 1 shows two external devices 200 and three input devices 300 to show various types of external device 200 and input device 300 according to the present disclosure. However, one or more external devices 200 may be connected to the electronic device 100, and one or more input devices 300 may also be connected to the electronic device 100.

"The electronic device 100" according to the present disclosure refers to a device capable of displaying an image or content on a display 110. In addition, the electronic device 100 may transmit and receive various signals and information through communication connection with the external device 200 and the input device 300. In particular, the electronic device 100 may display content received from the external device 200 on the display 110 and receive a signal corresponding to user input that is input into the input device 300. For example, FIG. 1 shows a television (TV) as an example of the electronic device 100. However, any other device capable of displaying an image or content and communicating with the external device 200 and the input device 300, such as a monitor, a laptop, or a tablet personal computer (PC), may be included in the electronic device 100 according to the present disclosure without any limitation on its type.

In the present disclosure, "the content" is used as a general term to collectively refer to all types of images capable of being displayed on the display 110 of the electronic device 100. For example, the content may include a photograph, video content, a screen mirrored from the external device 200, a screen provided by the operating system or application of the electronic device 100 or the like.

"The electronic device 200" according to the present disclosure refers to a device capable of providing the content. In detail, the external device 200 may transmit an image signal corresponding to the content to the electronic device 100 through the communication connection with the electronic device 100. The external device 200 may also be referred to as a "source device" because the external device 200 is a device that provides a source of the content. For example, FIG. 1 shows a PC 200-1 and a console game machine 200-2 as examples of the external device 200. However, any other device capable of providing the content, such as a set-top box or a smartphone, may correspond to the external device 200 according to the present disclosure.

According to the present disclosure, "the input device 300" refers to a device capable of receiving the user input. In detail, if the user input is received as a user manipulates the input device 300, the signal corresponding to the received user input may be transmitted to the electronic device 100. The input device 300 may be referred to as a "controller" or the like because the input device 300 is a device for receiving the user manipulation. For example, FIG. 1 shows a mouse 300-1, a keyboard 300-2, and a game pad 300-3 as examples of the input device 300. However, any other device capable of receiving the user input may correspond to the input device 300 according to the present disclosure.

Meanwhile, FIG. 1 shows that the external devices 200 and the input devices 300 are connected to the electronic device 100 in a wired manner, which is only an example, and at least one of the external device 200 and the input device 300 may perform the communication connection with the electronic device 100 in a wireless manner.

Hereinafter, the various embodiments according to the present disclosure are described with reference to FIGS. 2 to 12.

Figure 2:
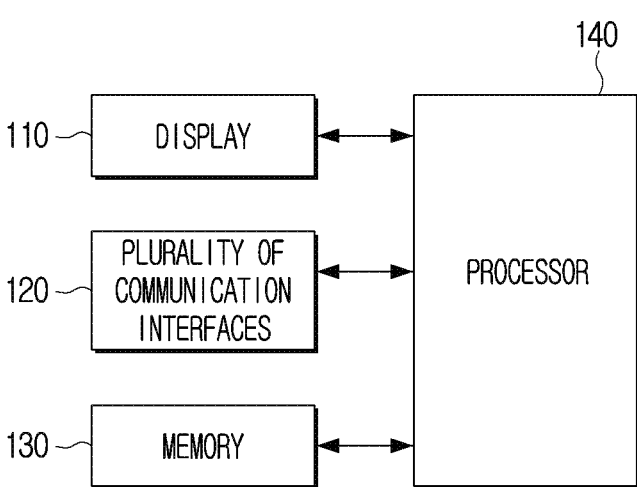
FIG. 2 is a block diagram showing a brief configuration of the electronic device according to an embodiment of the present disclosure.

FIG. 2 is a block diagram showing a brief configuration of the electronic device 100 according to an embodiment of the present disclosure.

As shown in FIG. 2, the electronic device 100 according to an embodiment of the present disclosure may include the display 110, a plurality of communication interfaces 120, a memory 130, and a processor 140.

The display 110 may output the image under control of the processor 140. In detail, the display 110 may output the content according to the present disclosure on the basis of image data stored in the memory 130, the image signal received from the external device 200 or the like. In addition, the display 110 may also display a user interface (UI).

The display 110 may be implemented as a liquid crystal display (LCD) panel, an organic light emitting diode (OLED) panel or the like. In addition, the display 110 may be implemented as a flexible display, a transparent display or the like in some cases. However, the display 110 according to the present disclosure is not limited to any specific type.

The plurality of communication interfaces 120 may include a circuit and may communicate with the external device 200. In detail, the processor 140 may receive various data or information from the external device 200 or the input device 300 connected thereto through the communication interface 120, and also transmit various data or information to the external device 200. The plurality of communication interfaces 120 may be implemented according to the present disclosure. Some of the plurality of communication interfaces 120 may be used for their communication with the external device 200, and some of the plurality of communication interfaces 120 may be used for their communication with the input device 300.

The communication interface 120 may include at least one of a wireless fidelity (WiFi) module, a Bluetooth module, a wireless communication module, a near field communication (NFC) module, a high-definition multimedia Interface (HDMI) module, a universal serial bus (USB) module, and an ultra wide band (UWB) module.

In detail, the WiFi module and the Bluetooth module may respectively perform the communication by using a WiFi method and a Bluetooth method. In case of using the WiFi module or the Bluetooth module, the communication interface 120 may first transmit and receive various connection information such as a service set identifier (SSID), connect the communication by using this connection information, and then transmit and receive the various information. Meanwhile, the HDMI module is one of uncompressed digital video/audio interface standards, and may provide an interface between the electronic device 100 and the external device 200 that provides the content. The USB module may provide a communication system between the electronic device 100 and the external device 200 that provides the content by using predefined input and output standard protocols. In addition to the HDMI module and the USB module, the communication interface 120 may be implemented as any of various modules to input/output video/audio data between the electronic device 100 and the external device 200.

In addition, the wireless communication module may perform the communication based on various communication protocols such as institute of electrical and electronics engineers (IEEE), Zigbee, 3rd generation (3G), 3rd generation partnership project (3GPP), long term evolution (LTE), and 5th Generation (5G). In addition, the NFC module may perform the communication by using an NFC method that uses a 13.56 MHz band among various radio frequency identification (RF-ID) frequency bands such as 135 kHz, 13.56 MHz, 433 MHz, 860 to 960 MHz, and 2.45 GHz. In addition, the UWB module may accurately measure time of arrival (ToA), which is time at which a pulse reaches a target, and an angel of arrival (AoA), which is an angle of arrival of a pulse at a transmission device, through the communication between UWB antennas, and may thus perform accurate distance and location recognition within an error range of several tens of centimeters (cm) indoors.

In particular, in the various embodiments according to the present disclosure, the processor 140 may receive a signal caused by the manipulation of the input device 300 from the input device 300 through the communication interface 120. In addition, the processor 140 may receive the image signal from the external device 200 through the communication interface 120. In addition, the processor 140 may transmit a control signal for powering on the external device 200 or the input device 300, or a control signal for powering off the external device 200 or the input device 300 if the communication interface 120 is implemented to transmit the control signal to the external device 200 or the input device 300, such as HDMI consumer electronics control (CEC).

The memory 130 may store at least one instruction regarding the electronic device 100. In addition, the memory 130 may store an operating system (O/S) for driving the electronic device 100. In addition, the memory 130 may also store various software programs or applications for operating the electronic device 100 according to the various embodiments of the present disclosure. In addition, the memory 130 may include a semiconductor memory such as a flash memory, or a magnetic storage medium such as a hard disk.

In detail, the memory 130 may store various software modules for operating the electronic device 100 according to the various embodiments of the present disclosure, and the processor 140 may control the operation of the electronic device 100 by executing the various software modules stored in the memory 130. That is, the memory 130 may be accessed by the processor 140, and the processor 140 may perform readout, recording, correction, deletion, update and the like of the data in the memory 130.

Meanwhile, in the present disclosure, the term "memory 130" may include the memory 130, a read only memory (ROM, not shown), or a random access memory (RAM, not shown) in the processor 140, or a memory card (not shown, for example, a micro secure digital (SD) card or a memory stick) mounted in the electronic device 100.

In particular, in the various embodiments according to the present disclosure, the memory 130 may store mapping information indicating a mapping relationship between at least one external device 200 and at least one input device 300, information on a user setting on which the mapping information is based, information on a history of the signal reception from the input device 300 on which the mapping information is based or the like. In addition, the memory 130 may store the image signal received from the external device 200, information on the plurality of applications, information on the user interface or the like. In addition, the memory 130 may store various information necessary within a range of achieving the purpose of the present disclosure, and the information stored in the memory 130 may be updated as the information is received from the external device 200 or input by the user.

The processor 140 may control overall operations of the electronic device 100. In detail, the processor 140 may be connected to the components of the electronic device 100 including the display 110, the communication interface 120, and the memory 130, and control the overall operations of the electronic device 100 by executing at least one instruction stored in the memory 130 as described above.

The processor 140 may be implemented in various ways. For example, the processor 140 may be implemented as at least one of an application specific integrated circuit (ASIC), an embedded processor, a microprocessor, hardware control logic, a hardware finite state machine (FSM), or a digital signal processor (DSP). Meanwhile, in the present disclosure, the term "processor 140" may be used to indicate a central processing unit (CPU), a graphic processing unit (GPU), a main processing unit (MPU) or the like.

In particular, in the various embodiments according to the present disclosure, the processor 140 may detect the user manipulation of the input device 300 and control the display 110 to display the content provided from the external device 200 corresponding to the input device 300.

In detail, the processor 140 may receive the signal caused by the manipulation of the first input device 300 from the first input device 300 among at least one input device 300 through the first communication interface 120 among the plurality of communication interfaces 120. Here, the first input device 300 refers to one input devices 300 that has a history of being connected to the electronic device 100, such as a mouse, a keyboard, or a game pad, connected to the electronic device 100. In addition, the first communication interface 120 refers to the communication interface 120 that connects the electronic device 100 and the first input device 300 to each other, and may be, for example, the Bluetooth module or the USB module.

Meanwhile, in the present disclosure, the term "manipulation" of the input device 300 is used as a general term to collectively indicate a user action to input the user input through the input device 300, such as the user action of pressing a key, a physical button or a soft button, included in the input device 300, and the user action of moving the input device 300.

The processor 140 may identify the first external device 200 corresponding to the first input device 300 among at least one external device 200 on the basis of the mapping information if the signal caused by the manipulation of the first input device 300 is received.

Here, "the mapping information" refers to information indicating the mapping relationship between at least one external device 200 and at least one input device 300. In detail, the mapping information may be acquired on the basis of at least one of the user setting or the history of the signal reception from at least one input device 300 within a threshold time after the signal is received from at least one external device 200. In addition, the mapping information may be predefined by a developer considering various types of external devices 200 and various types of input devices 300, and the predefined mapping information may be updated or changed by the user setting.

In an embodiment, the mapping information may be acquired on the basis of the user setting and stored in the memory 130. In detail, the processor 140 may control display 110 to output the user interface including a list indicating at least one external device 200 or a list indicating at least one input device 300, and receive the user input for selecting the external device 200 corresponding to the input device 300 through the user interface. In addition, the processor 140 may generate information on the input device 300 and the corresponding external device 200 as the mapping information on the basis of the user input, and store the generated mapping information in the memory 130.

For example, the processor 140 may provide the user with the user interface indicating a list of external devices 200 that includes the PC, the console game machine, and the set-top box. In addition, the processor 140 may receive the user input through the user interface for selecting that the PC is the external device 200 corresponding to the mouse. In this case, the processor 140 may generate the mapping information indicating that the mouse and the PC correspond (or are mapped) to each other, and store the generated mapping information in the memory 130.

In an embodiment, the mapping information may be stored in the memory 130 by being acquired on the basis of the history of the signal reception from at least one input device 300 within the threshold time after receiving the signal from at least one external device 200. For example, the processor 140 may generate the mapping information indicating that the console game machine and the game pad correspond to each other, and store the generated mapping information in the memory 130 if the signal is received from the game pad within 10 seconds after receiving the signal from the console game machine, which is the external device 200.

The processor 140 may identify the first external device 200 corresponding to the first input device 300 that transmits the signal caused by the user manipulation to the electronic device 100 among at least one external device 200 on the basis of the mapping information stored in the memory 130 if the mapping information is stored in the memory 130 as described above.

The processor 140 may receive the image signal from the first external device 200 through the second communication interface 120 among the plurality of communication interfaces 120 if the first external device 200 corresponding to the first input device 300 is identified.

Here, the second external device 200 refers to one external device 200 among at least one external device 200 that has a history of being connected to the electronic device 100, and may be, for example, the PC, the console game machine, or the set-top box, connected to the electronic device 100. In addition, the second communication interface 120 refers to the communication interface 120 that connects the electronic device 100 and the first input device 200 to each other, and may be, for example, the WiFi module or the HDMI module. Meanwhile, the image signal refers to a signal that includes information related to the image, and the term "image signal" may be replaced with a term such as the image data or a video input signal.

In detail, the processor 140 may control the second communication interface 120 to transmit a signal requesting transmission of the image signal, and receive the image signal from the first external device 200 through the second communication interface 120. In addition, the image signal may be set to be transmitted from the first external device 200 to the electronic device 100 without any request from the electronic device 100 if the first electronic device 100 and the first external device 200 are connected to each other and power of the first electronic device 100 and power of the first external device 200 are both powered on.

Meanwhile, the processor 140 may transmit a signal requesting to stop the transmission of the image signal to the second external device 200 if the first external device 200 corresponding to the first input device 300 is identified while the image signal is received from the second external device 200.

The processor 140 may control the display 110 to display first content corresponding to the image signal if the image signal is received from the first external device 200. In detail, the processor 140 may change and display the content displayed on the display 110 by determining the communication interface 120 for the communication connection with the first external device 200 among the plurality of communication interfaces 120 as the communication interface 120 for providing the image signal corresponding to the content displayed on the display 110.

For example, the processor 140 may change the content displayed on the display 110 from second content to the first content by changing "external input", referred to as such, from the communication interface 120 corresponding to the second external device 200 to the communication interface 120 corresponding to the first external device 200 if the first external device 200 corresponding to the first input device 300 is identified while the second content is displayed on the display 110 of the electronic device 100 on the basis of the image signal received from the second external device 200.

Meanwhile, the processor 140 may control the display 110 to split and display the second content and the first content on a split screen (i.e., picture by picture (PBP)), and control the display 110 to display the first content in a partial region of the second content (i.e., picture in picture (PIP)) if the second content is displayed on the display 110 on the basis of the image signal received from the second external device 200.

According to the embodiment described above, the electronic device 100 may improve user convenience by changing the external device 200 for providing the content displayed on the display 110 of the electronic device 100 on the basis of the manipulation of the input device 300 connected to the electronic device 100.

Figure 3:
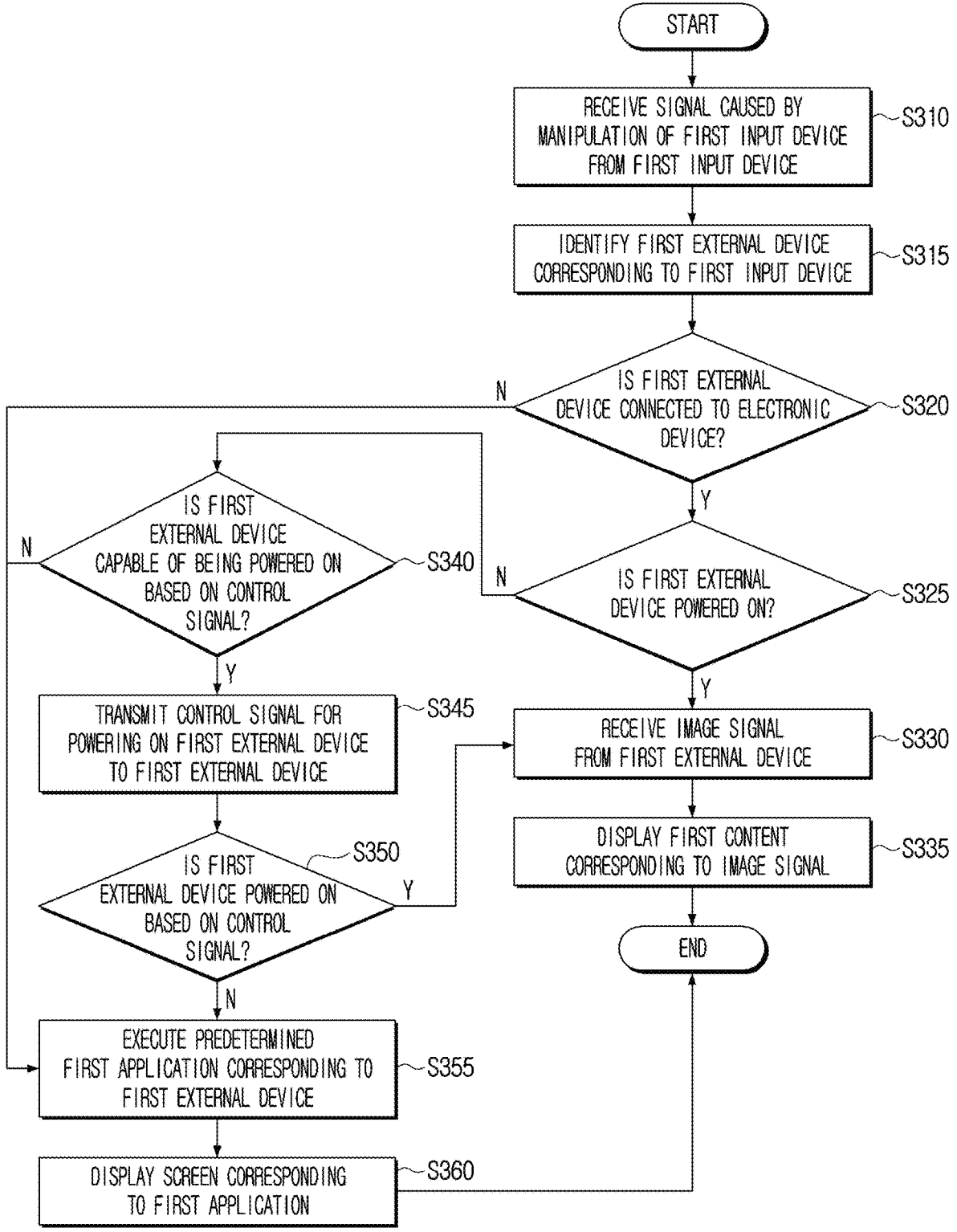
FIG. 3 is a flowchart for describing various embodiments of the present disclosure based on a connection state between the electronic device and the external device and a power state of the external device.

FIG. 3 is a flowchart for describing the various embodiments of the present disclosure based on a connection state between the electronic device 100 and the external device 200 and a power state of the external device 200.

In providing the description with reference to FIG. 2, the various embodiments according to the present disclosure are described assuming a state where the first external device 200 is connected to the electronic device 100 and a state where the first external device 200 is powered on. On the other hand, in providing the description with reference to FIG. 3, the embodiments are described considering a state where the first external device 200 is not connected to the electronic device 100 or a state where the first external device 200 is powered off.

Referring to FIG. 3, the processor 140 may receive the signal caused by the manipulation of the first input device 300 from the first input device 300 (S310). In detail, the processor 140 may receive the signal caused by the manipulation of the first input device 300 from the first input device 300 through the first communication interface 120. In addition, the processor 140 may identify the first external device 200 corresponding to the first input device 300 if the signal caused by the manipulation of the first input device 300 is received (S315). A process of identifying the first external device 200 corresponding to the first input device 300 may be performed on the basis of the mapping information stored in the memory 130, as described above in the description provided with reference to FIG. 2.

The processor 140 may identify whether the first external device 200 is connected to the electronic device 100 if the first external device 200 corresponding to the first input device 300 is identified (S320). In detail, the first external device 200 may be identified among at least one external device 200 that has the history of being connected to the electronic device 100, and the processor 140 may thus identify whether the first external device 200 is connected to the electronic device 100 through the second communication interface 120 among the plurality of communication interfaces 120 at a time point at which the first external device 200 is identified. For example, the processor 140 may identify whether the first external device 200 is connected to the electronic device 100 through the HDMI module in the wired manner, whether the first external device 200 is connected to the electronic device 100 through the WiFi Direct in the wireless manner or the like.

The processor 140 may execute a first application predetermined to correspond to the first external device 200 (S355) if the first external device 200 is identified as not being connected to the electronic device 100 (S320—N). In addition, the processor 140 may control the display 110 to display a screen corresponding to the first application (S360). Here, the first application refers to a predetermined application corresponding to the first external device 200 among the plurality of applications provided by the electronic device 100. Information on the plurality of applications and the information on a correspondence relationship between the plurality of applications and the external device 200 may be stored in the memory 130 of the electronic device 100. The correspondence relationship between the external device 200 and the application may be set by the developer or the user.

In detail, if the first external device 200 is identified as not being connected to the electronic device 100, which may be considered as a case where the first content is unable to be displayed because the image signal is unable to be received from the first external device 200. Therefore, the processor 140 may execute the first application corresponding to the first external device 200 and display a screen corresponding to the first application, thereby providing a function that best matches intention of the user who manipulates the first input device 300 even if the first external device 200 is not connected.

For example, the first application among the plurality of applications may be set as a web browser application and correspond to the PC, which is the first external device 200, and the second application among the plurality of applications may be set as an over the top (OTT) service application and correspond to the console game machine, which is the second external device 200. Meanwhile, a third application among the plurality of applications may be set as an Internet of Things (IoT) device management application or a home screen application, and provided if an application corresponding to the external device 200 is not set.

The process may identify whether the first external device 200 is powered on (S325) if the first external device 200 is identified as being connected to the electronic device 100 (S320—N). In detail, the processor 140 may identify whether the first external device 200 is powered on by detecting whether the signal is received from the first external device 200 or whether a current having a predetermined value or more is flowing through the first external device 200.

The processor 140 may receive a first image signal from the first external device 200 (S330) if the first external device 200 is identified as being powered on (S325—Y). In addition, the processor 140 may control the display 110 to display the first content corresponding to the first image signal (S335). In other words, the processor 140 may automatically change the screen of the display 110 to provide the first content provided from the first external device 200 as described in the description provided with reference to FIG. 2 if the first external device 200 is connected to the electronic device 100 and the first external device 200 is powered on.

The processor 140 may identify whether the first external device 200 is capable of being powered on based on the control signal (S340) if the first external device 200 is identified as not being powered on (S325—N). In detail, the processor 140 may identify whether the first external device 200 is capable of being powered on based on the control signal on the basis of whether the control signal is capable of being transmitted to the first external device 200 through the second communication interface 120, whether the first external device 200 is implemented to be capable of being powered on based on the control signal received from the electronic device 100 or the like. For example, the processor 140 may identify that the first external device 200 is capable of being powered on based on the control signal if the second communication interface 120 is implemented to transmit the control signal to the external device 200, such as HDMI consumer electronics control (CEC).

The processor 140 may execute the first application corresponding to the first external device 200 (S355) and display the screen corresponding to the first application (S360) if the first external device 200 is identified as being unable to be powered on based on the control signal (S340—N). In other words, the processor 140 may alternatively provide the first application corresponding to the first content instead of displaying the first content, as in the case where the first external device 200 is not connected to the electronic device 100 if the first external device 200 is connected to the electronic device 100 and the first external device 200 is powered off, and the first external device 200 is unable to be powered on based on the control signal transmitted by the electronic device 100. Steps S355 and S360 are described above, and redundant descriptions of other similar contents are thus omitted.

The processor 140 may transmit the control signal for powering on the first external device 200 to the first external device 200 to the first external device 200 (S345) if the first external device 200 is identified as being capable of being powered on based on the control signal (S340—Y). In detail, the processor 140 may control the second communication interface to transmit the control signal for powering on the first external device 200 to the first external device 200.

The processor 140 may identify whether the first external device 200 is powered on based on the control signal (S350) after transmitting the control signal for powering on the first external device 200 to the first external device 200. In addition, the processor 140 may receive the first image signal from the first external device 200 (S330) and display the first content corresponding to the first image signal (S335) if the first external device 200 is identified as being powered on based on the control signal. In other words, the processor 140 may automatically change the screen of the display 110 to provide the first content provided from the first external device 200 if the first external device 200 is powered off and then powered on by the transmission of the control signal.

The processor 140 may execute the first application predetermined to correspond to the first external device 200 (S355) and display the screen corresponding to the first application (S360) if the first external device 200 is identified as not being powered on based on the control signal. In other words, the processor 140 may alternatively provide the first application corresponding to the first content instead of displaying the first content, as in the case where the first external device 200 is not connected to the electronic device 100 and the first external device 200 is unable to be powered on based on the control signal if the first external device 200 is not powered on despite the transmission of the control signal.

Meanwhile, the description hereinabove describes the embodiment of transmitting the control signal for powering on the electronic device 100 if the electronic device 100 is powered off. However, the processor 140 may also transmit the control signal for powering off the external device 200 connected to the electronic device 100. In detail, the processor 140 may control at least one communication interface 120 among the plurality of communication interfaces 120 to transmit the control signal for powering off at least one external device 200 connected to the electronic device 100 to each of at least one external device 200 if the user input for powering off the electronic device 100 is received. This control mechanism may enable collective power management for the electronic device 100 and at least one external device 200 connected to the electronic device 100.

According to the embodiment described above, the electronic device 100 may provide the content that matches the user intention by remotely powering on the external device 200 and then displaying the content provided from the external device 200, or alternatively providing an application corresponding to the content provided from the external device 200 instead of displaying the content even in the state where the external device 200 is not connected to the electronic device 100 or the external device 200 is powered off.

Figure 4:
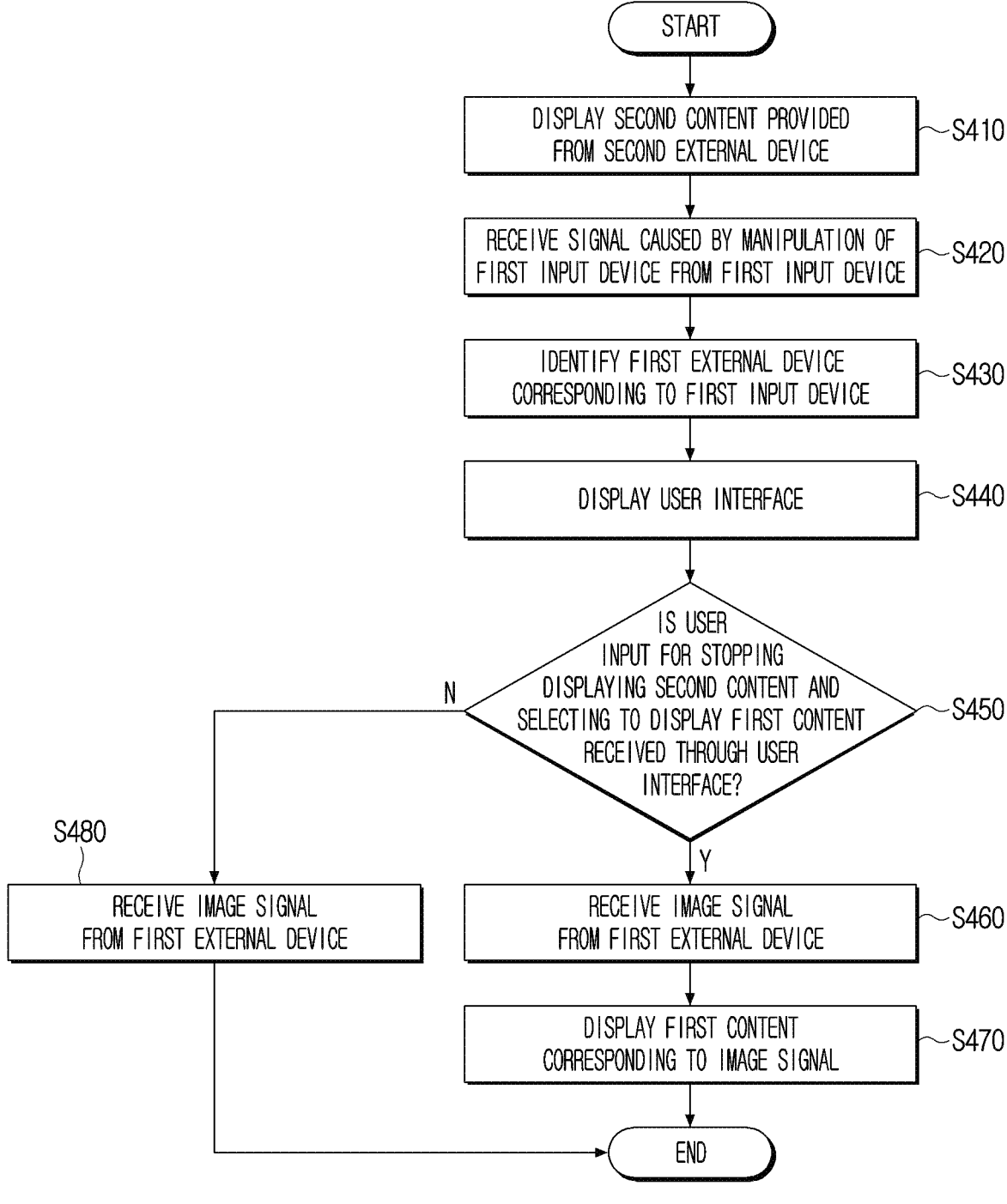
FIG. 4 is a flowchart for describing an embodiment of the present disclosure related to receiving user input on whether to display content through a first user interface.

FIG. 4 is a flowchart for describing an embodiment of the present disclosure related to receiving the user input on whether to display the content through a first user interface. In addition, FIGS. 5 to 8 are diagrams exemplarily showing the first user interfaces according to the various embodiments of the present disclosure.

The description hereinabove describes the embodiment of automatically providing the first content provided from the first external device 200 if the first external device 200 corresponding to the first input device 300 is identified. However, the processor 140 may confirm the user intention before displaying the first content provided from the first external device 200, such as in a case where the user does not intend to display the first content provided from the first external device 200 on the display 110. For this purpose, the processor 140 may display the first user interface as described below, and determine whether to display the first content on the basis of the user input received through the first user interface.

Referring to FIG. 4, the processor 140 may control the display 110 to display the second content provided from the second external device 200 (S410). The first user interface according to the present disclosure may be provided not only in the case where the second content is displayed on the display 110, but also in a case where no content is displayed on the display 110, that is, in a case where no image signal is received from at least one external device 200. However, hereinafter, the case where the second content is displayed on the display 110 is described as an example. Here, the second content refers to content that is different from the first content provided by the first external device 200.

The processor 140 may receive the signal caused by the manipulation of the first input device 300 from the first input device 300 while the second content provided from the second external device 200 is displayed (S420). Here, the second external device 200 refers to a device different from the first external device 200 that provides the first content. The processor 140 may identify the first external device 200 corresponding to the first input device 300 if the signal caused by the manipulation of the first input device 300 is received (S430).

The processor 140 may control the display 110 to display the first user interface if the first external device 200 is identified (S440). In detail, the processor 140 may display the first user interface as shown in FIGS. 5 to 8 on the basis of information on the first user interface stored in the memory 130. However, the first user interface shown in FIGS. 5 to 8 is only an example.

Figure 5:
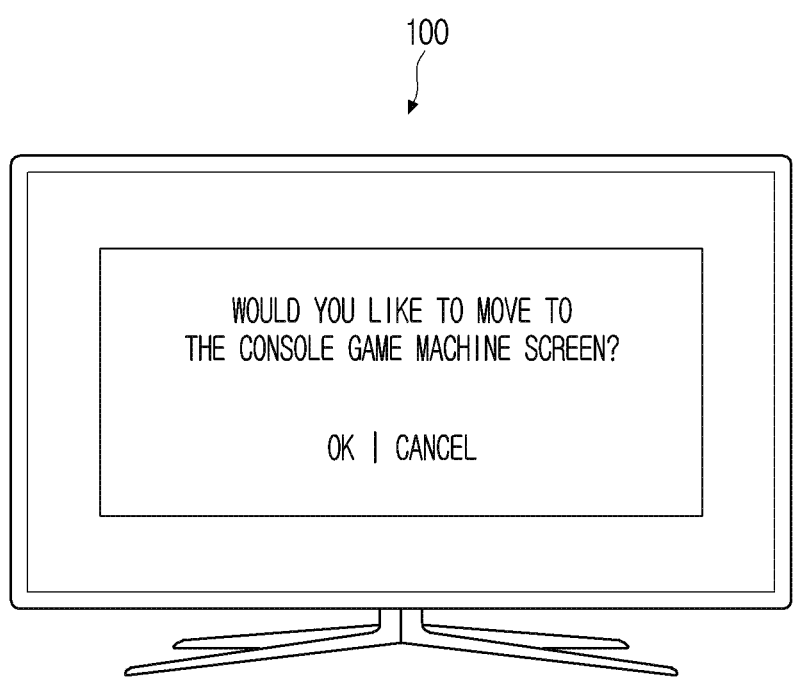
FIGS. 5, 6, 7 to 8 are diagrams exemplarily showing the first user interfaces according to the various embodiments of the present disclosure.

Referring to the example shown in FIG. 5, the first user interface may include a guidance message to confirm whether to display the content provided from the console game machine, which is the first external device 200, such as "Would you like to move to the console game machine screen?", and user interface (UI) items for user selection, such as "OK" and "CANCEL".

Figure 6:
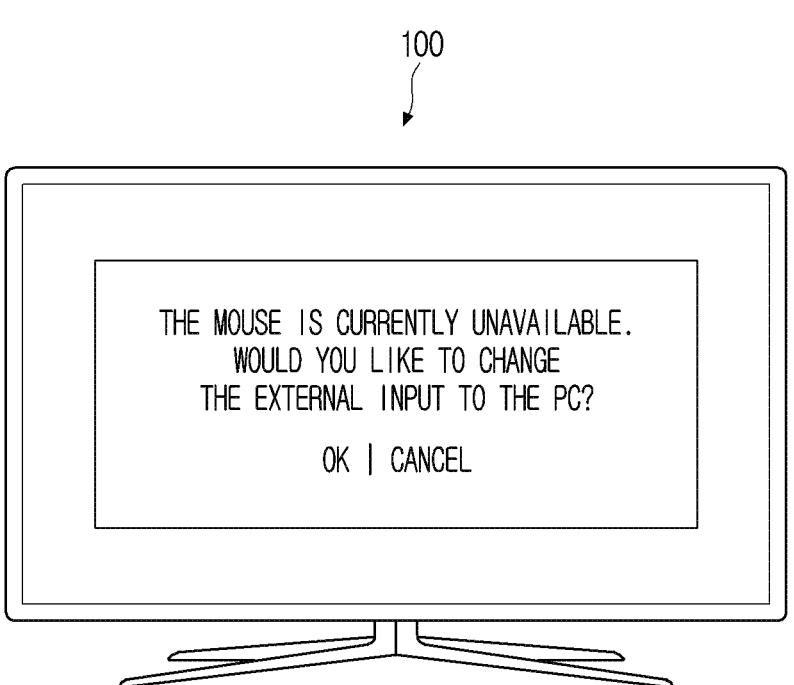

Referring to the example shown in FIG. 6, the first user interface may include a guidance message indicating that the mouse, which is the first input device 300, is unable to be used on a screen of the second content currently being displayed, such as "The mouse is currently unavailable. Would you like to change the external input to the PC?", a guidance message for confirming whether to display the content provided from the PC, which is the first external device 200, and the UI items for the user selection, such as "OK" and "CANCEL".

Figure 7:
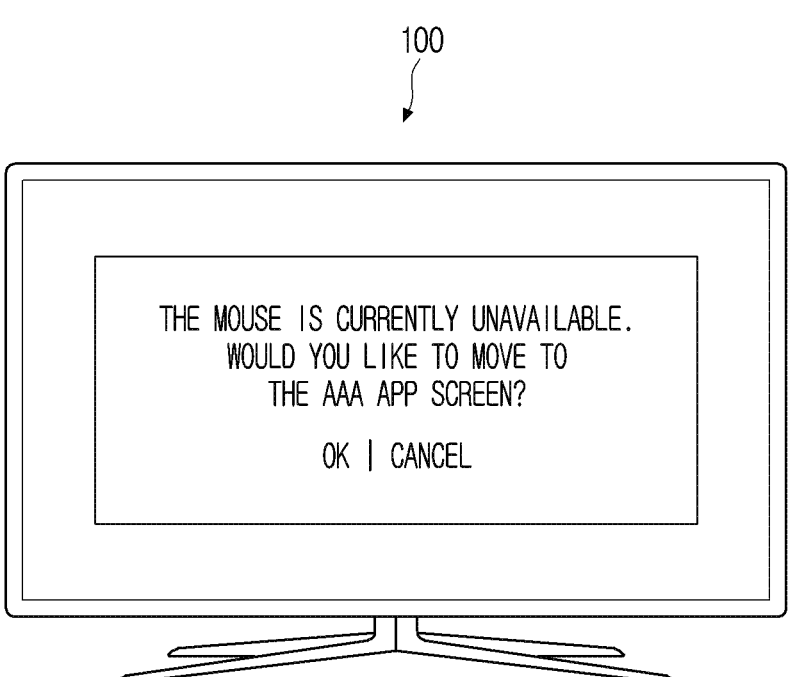

Referring to the example shown in FIG. 7, the first user interface may include a guidance message indicating that the mouse, which is the first input device 300, is unable to be used on the screen of the second content currently being displayed, such as "The mouse is currently unavailable. Would you like to move to the AAA app screen?", a guidance message for confirming whether to display the AAA application screen, which is an application provided by the electronic device 100 itself, and the UI items for the user selection, such as "OK" and "CANCEL".

Here, the guidance message for confirming whether to display the AAA application screen instead of the message for confirming whether to display the content provided from the PC, which is the first external device 200, may be provided based on the assumption that the first external device 200 is not connected to the electronic device 100 or the first external device 200 is powered off, as described in the embodiment shown in FIG. 3.

Figure 8:
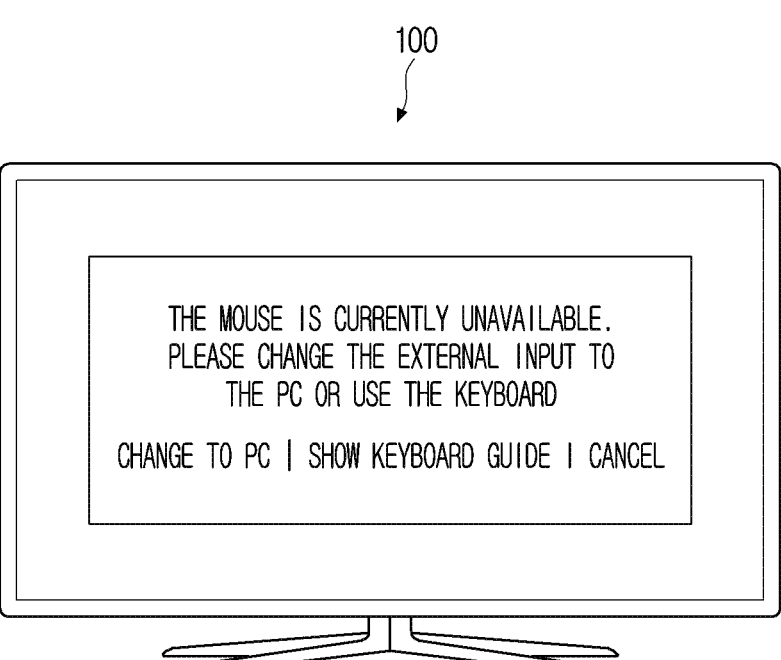

Referring to the example shown in FIG. 8, the first user interface may include a guidance message indicating that the mouse, which is the first input device 300, is unable to be used on the screen of the second content currently being displayed, such as "The mouse is currently unavailable. Please change the external input to the PC or use the keyboard", a guidance message for confirming whether to display the content provided from the PC, which is the first external device 200, a guidance message indicating that the keyboard, which is different from the first input device 300, is capable of being used on the screen of the second content currently being displayed, and the UI items for the user selection, such as "Change to PC", "Show keyboard guide", and "CANCEL".

The processor 140 may receive the image signal from the first external device 200 (S460) and display the first content corresponding to the image signal (S470) if the user input for stopping displaying the second content and selecting to display the first content is received through the first user interface (S450—Y). On the other hand, the processor 140 may maintain the operation of the display 110 (S480) if the user input for stopping displaying the second content and selecting to display the first content is not received through the first user interface (S450—N).

Here, the case where the user input for selecting to stop displaying the second content and display the first content is not received may include the case where the user input for selecting the UI item such as "CANCEL" shown in FIGS. 5 to 8 is received, and a case where no user input is received through the first user interface for a predetermined time.

Meanwhile, in the example described above, the guidance message such as "the mouse is currently unavailable" may be displayed based on the assumption that the screen currently displayed on the display of the electronic device 100 does not support the mouse (for example, the game content screen is being displayed). In addition, a mouse pointer may be displayed on a layer corresponding to the first user interface to enable the UI item to be selected using the mouse displayed on the first user interface even if the screen currently displayed on the display 110 of the electronic device 100 does not support the mouse.

Meanwhile, the description herein above describes the embodiment of displaying the first user interface before the image signal is received from the first external device 200 after the first external device 200 corresponding to the first input device 300 is identified. However, in some embodiments, the first user interface may be provided at various time points, such as the first user interface being displayed while the image signal is received from the first external device 200.

According to the embodiment described above, the electronic device 100 may improve the user convenience by confirming the user intention before switching the screen of the display 110 to display the content provided from the external device 200.

Figure 9:
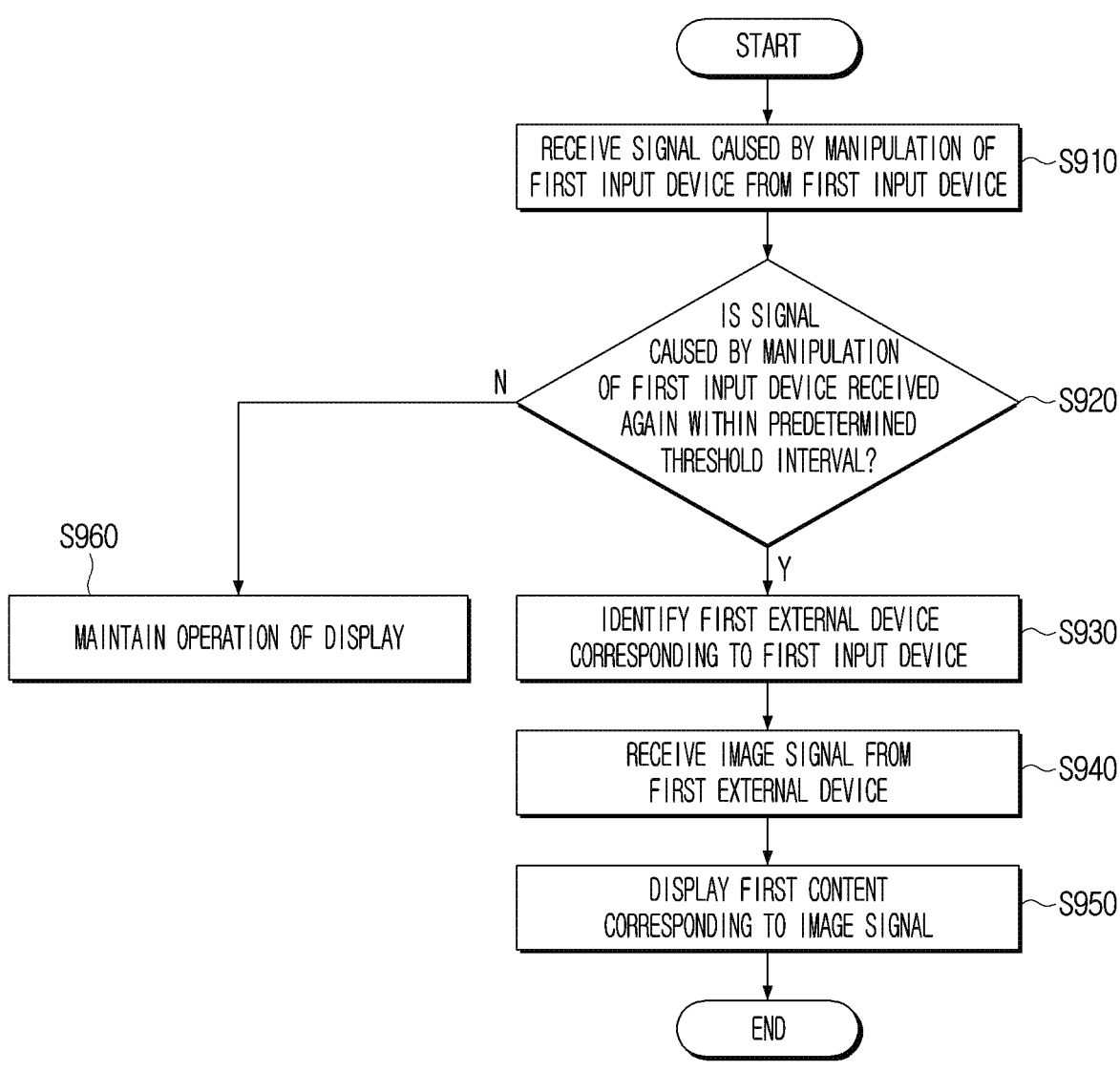
FIG. 9 is a flowchart for describing an embodiment of the present disclosure related to identifying whether the input device is mismanipulated.

FIG. 9 is a flowchart for describing an embodiment of the present disclosure related to identifying whether the input device 300 is mismanipulated.

The description hereinabove describes the embodiment of identifying the first external device 200 corresponding to the first input device 300 if the signal is received from the first input device 300. However, the user may touch the first input device 300 without the manipulation intention. Even if the first input device 300 is mismanipulated as described above, receiving the content from the first external device 200 corresponding to the first input device 300 and displaying the same on the display 110 may be contrary to the user intention.

Therefore, the processor 140 according to the present disclosure may determine whether to display the first content received from the first external device 200 based on whether the signal caused by the manipulation of the first input device 300 is received again within a predetermined first threshold interval (S920) if the signal caused by the manipulation of the first input device 300 is received from the first input device 300 (S910).

The processor 140 may identify the first external device 200 corresponding to the first input device 300 (S930), receive the image signal from the first external device 200 (S940), and display the first content corresponding to the image signal (S950) if the signal caused by the manipulation of the first input device 300 is received again within the first threshold interval (S920—Y). Here, the first threshold interval may be calculated based on the time point at which a first signal received from the first input device 300 is received, as well as a predetermined time after the reception of the first signal received from the first input device 300.

For example, the processor 140 may determine that the user has the intention to manipulate the first input device 300, and automatically change the screen of the display 110 to provide the first content provided from the first external device 200 if a second signal caused by the manipulation of the first input device 300 is received within the first threshold interval of 5 seconds after the first signal caused by the manipulation of the first input device 300 is received.

Meanwhile, signals of the first input device 300 may be sequentially generated due to the user manipulation. For example, if the user moves a position of the mouse, which is the first input device 300, the plurality of signals may be generated and transmitted to the electronic device 100, and the electronic device 100 may receive the plurality of signals within the first threshold interval. In this case, changing the screen of the display 110 to provide the first content provided from the first external device 200 on the basis of receiving the plurality of signals from the first input device 300 within the first threshold interval may be contrary to the user intention.

Therefore, as described above, the first threshold interval may be calculated after the predetermined time after the reception of the first signal received from the first input device 300. For example, the processor 140 may determine that the user has the intention to manipulate the first input device 300, and automatically change the screen of the display 110 to provide the first content provided from the first external device 200 if the second signal caused by the manipulation of the first input device 300 is received again within 5 seconds starting from 3 seconds after receiving the first signal caused by the manipulation of the first input device 300.

Meanwhile, the processor 140 may maintain the operation of the display 110 (S960) if the signal caused by the manipulation of the first input device 300 is not received again within the first threshold interval (S920—N). In detail, the processor 140 may control the display 110 to maintain the display of the second content if the second content is displayed on the display 110. The processor 140 may control the display 110 to maintain a state where no content is displayed on the display 110 if no content is displayed on the display 110.

Meanwhile, the description hereinabove describes the embodiment of identifying whether the first input device 300 is mismanipulated on the basis of whether the signal caused by the manipulation of the first input device 300 is received again within the first threshold interval. However, on the other hand, whether the first input device 300 is mismanipulated may also be identified on the basis of the number of times the signal caused by the manipulation of the first input device 300 is received.

According to the embodiment described above, the electronic device 100 may prevent the screen of the display 110 from being switched against the user intention if the input device 300 is mismanipulated.

Figure 10:
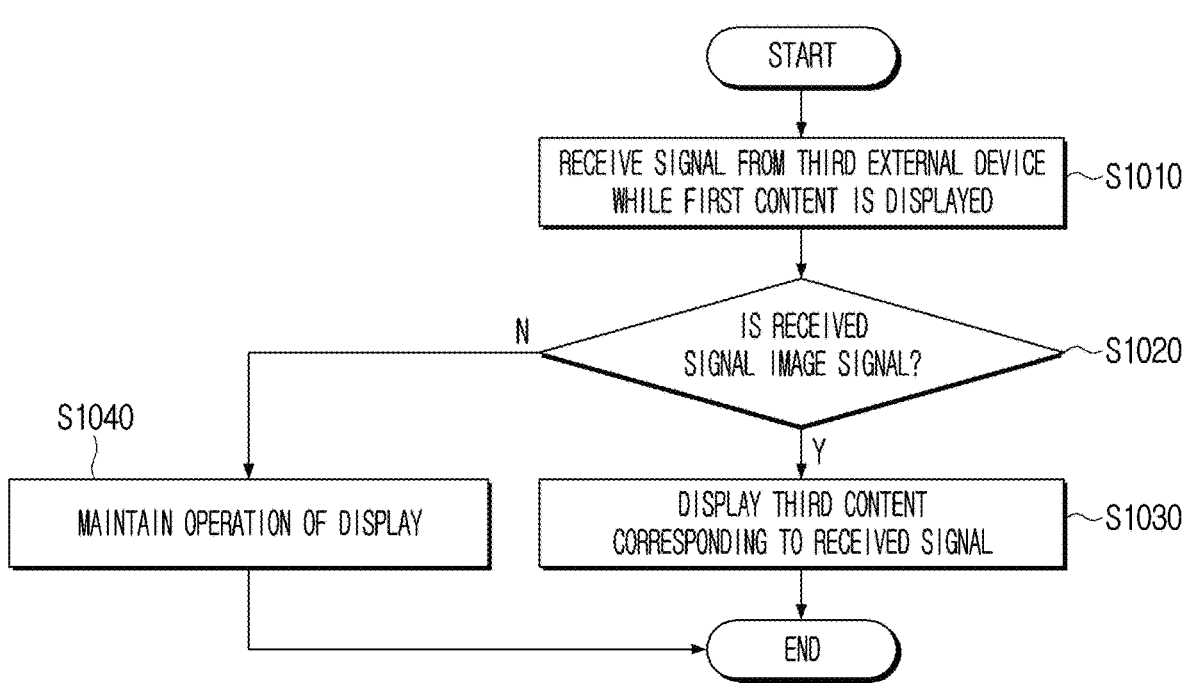
FIG. 10 is a flowchart for describing an embodiment of the present disclosure related to identifying a type of signal received from the external device.

FIG. 10 is a flowchart for describing an embodiment of the present disclosure related to identifying a type of signal received from the external device 200.

The description hereinabove describes the embodiment related to receiving the image signal from the external device 200 and displaying the content corresponding to the received image signal. However, a signal other than the image signal may be received from the external device 200. In addition, switching the screen displayed on the display 110 even if the signal other than the image signal is received may not only be unnecessary but may also cause user inconvenience. Accordingly, the processor 140 may identify the type of signal received from the external device 200 and determine whether to switch the screen displayed on the display 110 on the basis of the type.

In detail, referring to FIG. 10, the processor 140 may receive the signal from the third external device 200 while the first content is displayed (S1010). In addition, the processor 140 may identify whether the received signal is the image signal if the signal is received from the third external device 200 (S1020).

In detail, the processor 140 may identify whether the received signal is the image signal by identifying whether the received signal includes the information related to the image (e.g., pixel information).

The processor 140 may display the second content corresponding to the received signal if the received signal is the image signal (S1030). On the other hand, the processor 140 may maintain the operation of the display 110 if the received signal is not the image signal (S1040). For example, the processor 140 may maintain the first content being displayed without switching the screen of the display 110 to display the screen corresponding to the third external device 200 if the signal received from the third external device 200 is not the image signal, such as a signal received to update the software of the electronic device 100 as the third external device 200 is updated.

Meanwhile, as described above, a module for identifying the type of signal received from the external device may be implemented not only as the software module but also as a hardware module in the form of a system on chip.

According to the embodiment described above, the electronic device 100 may prevent the screen of the display 110 from being switched to thus cause the user inconvenience if the signal received from the external device 200 is an abnormal signal other than the image signal.

Figure 11:
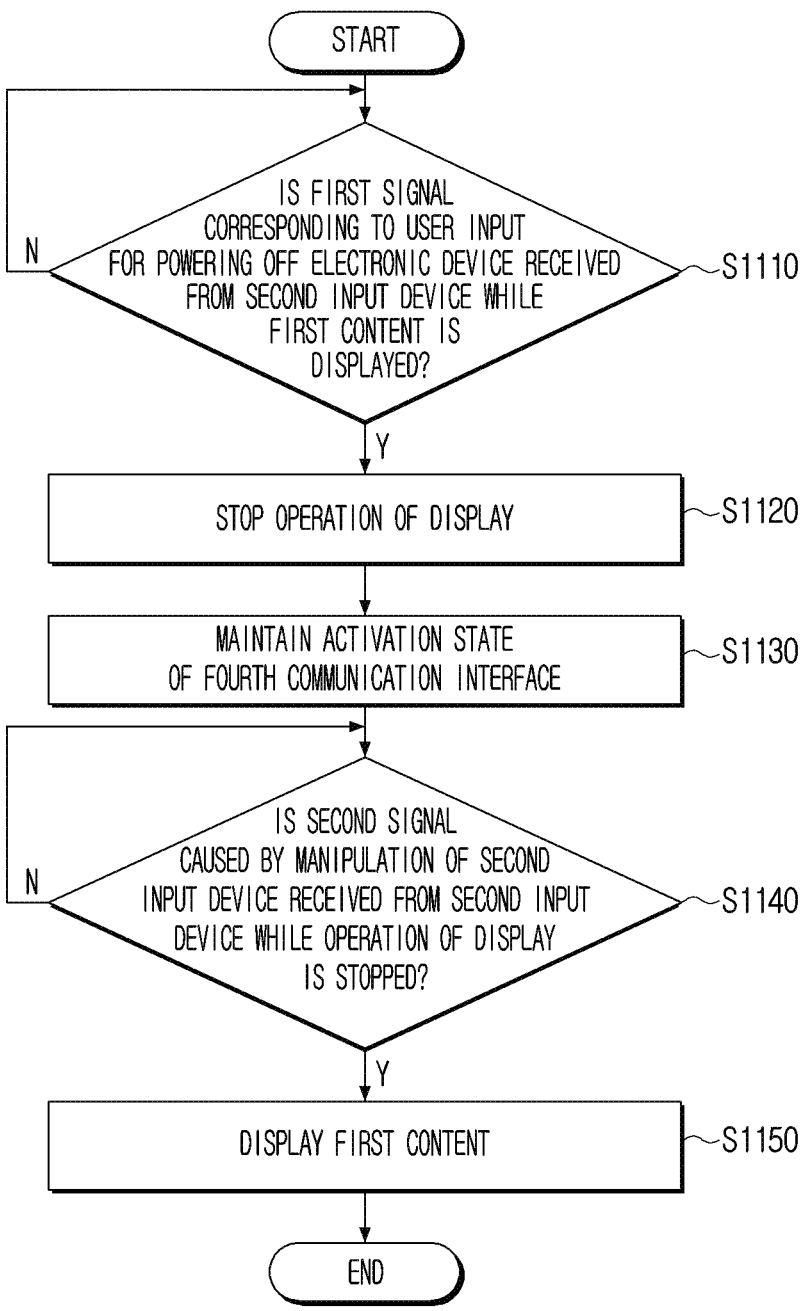
FIG. 11 is a flowchart for describing an embodiment related to maintaining an activation state of the electronic device.

FIG. 11 is a flowchart for describing an embodiment related to maintaining an activation state of the electronic device.

The description above describes embodiments such as changing the external device for providing the content on the basis of the manipulation of the input device connected to the electronic device on the assumption that the electronic device is not powered off. FIG. 11 shows an embodiment related to a case where the manipulation of the input device is received again after receiving the user input to power off the electronic device.

As shown in FIG. 11, the processor may receive the first signal corresponding to the user input for powering off the electronic device from a second input device while the first content is displayed (S1110). In detail, the processor may receive the first signal corresponding to the user input for powering off the electronic device from the second input device among at least one input device through the fourth communication interface among the plurality of communication interfaces while the first content is displayed.

Here, the second input device refers to the input device connected to the electronic device, and may be, for example, the mouse or the keyboard. The first signal refers to the signal corresponding to the user input for powering off the electronic device, and may be received on the basis of the user input for selecting a power-off item displayed on the display by using, for example, the mouse, which is the second input device. The fourth communication interface refers to the communication interface that connects the electronic device and the second input device to each other, and may be, for example, the Bluetooth module or the USB module.

The processor may maintain the operation of the electronic device until the first signal is received if the first signal is not received (S1110—N). Accordingly, the display of the first content may be maintained on the display until the first signal is received.

On the other hand, the processor may stop the operation of the display (S1120) and maintain an activation state of the fourth communication interface (S1130) if the first signal is received (S1110—Y). In detail, the processor may control the display to stop the operation of the display, and the processor may control the fourth communication interface to maintain the activation state of the fourth communication interface while the operation of the display is stopped.

The processor may receive the second signal caused by the manipulation of the second input device from the second input device while the operation of the display is stopped (S1140). The processor may receive the second signal caused by the manipulation of the second input device from the second input device through the fourth communication interface while the operation of the display is stopped.

The processor may maintain the operation of the electronic device until the second signal is received if the second signal is not received (S1140—N). Accordingly, the operation of the display may be maintained and the activation state of the fourth communication interface may also be maintained until the second signal is received.

On the other hand, the processor may display the first content (S1150) if the second signal is received (S1140—Y). That is, if the second signal is received, the processor may control the display to re-display the first content (i.e., content corresponding to the last source) being displayed on the display before receiving the first signal corresponding to the user input for powering off the electronic device. In some embodiments, a home screen or a screen provided by a predetermined application may be displayed.

The description hereinabove describes the case where the activation state of the fourth communication interface is maintained, and the second signal caused by the user manipulation is received from the second input device connected through the fourth communication interface. However, there are no particular limitations on the types and numbers of the communication interfaces maintaining their activation state, and on the types and numbers of the input devices connected to the communication interface maintaining its activation state, despite the user input to power off the electronic device among the plurality of communication interfaces.

According to a conventional technology, if the first signal corresponding to the user input for powering off the electronic device is received, the display as well as other components including the communication interface and may be powered off to prevent power consumption, and only an infrared signal receiving module may be exceptionally maintained to be active to receive the signal corresponding to the user input for powering on the electronic device from a remote control device. Therefore, according to the conventional technology, the electronic device is unable to receive the signal caused by the manipulation of the second input device even if the user manipulation is input to the second input device such as the mouse or the keyboard while the electronic device is powered off.

On the other hand, according to the present disclosure, if the first signal corresponding to the user input for powering off the electronic device is received, the electronic device may power off the display, and maintain the activation state of the fourth communication interface to receive the signal caused by the manipulation of the second input device. In other words, the electronic device may enter a standby mode that allows the electronic device to receive the signal caused by the manipulation of the second input device through the fourth communication interface even if the first signal corresponding to the user input for powering off the electronic device is received. In addition, the electronic device may receive the second signal caused by the manipulation of the second input device from the second input device through the activated fourth communication interface, even while the operation of the display is stopped.

Figure 12:
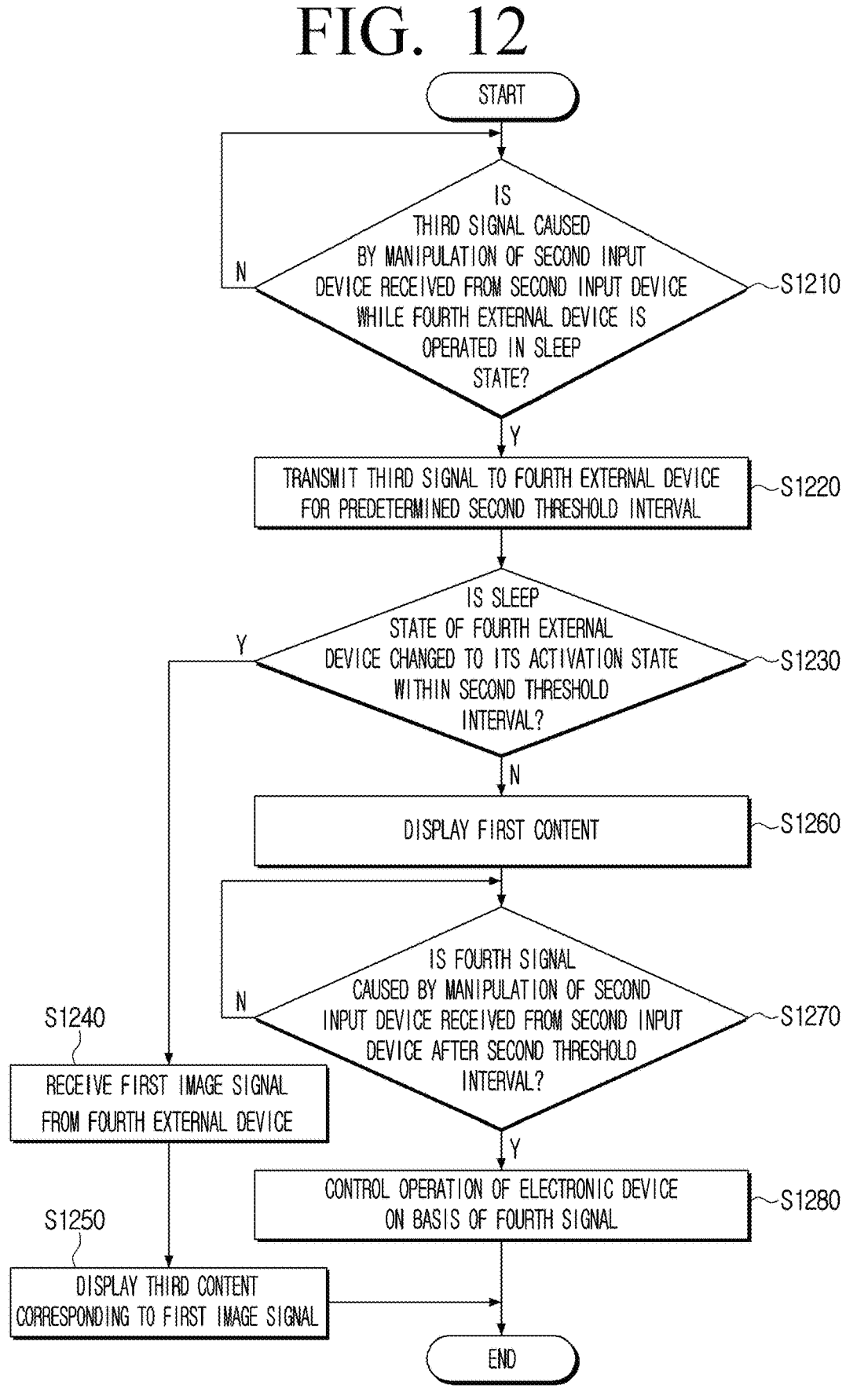
FIG. 12 is a flowchart for describing an embodiment related to a case where a fourth external device is operated in a sleep state.

FIG. 12 is a flowchart for describing an embodiment related to a case where the fourth external device is operated in a sleep state.

In providing the description with reference to FIG. 3, an embodiment of remotely powering on the external device and then displaying the content provided from the external device, or alternatively providing the application corresponding to the content instead of displaying the content provided from the external device is described in detail above in the state where the external device is not connected to the electronic device or the external device is powered off. In contrast, referring to FIGS. 12 to 14, the description describes an embodiment related to a case where the external device is connected to the electronic device, and the external device is powered on and in the sleep state.

Referring to FIG. 12, the processor may receive a third signal caused by the manipulation of the second input device from the second input device while the fourth external device is operated in the sleep state (S1210). Here, the sleep state refers to a state where the configuration of the external device is disabled. However, some configurations, such as the fifth communication interface, may maintain its activation state even in the sleep state of the fourth external device in order to receive a signal to activate the fourth external device.

The fourth external device refers to one external device connected to the electronic device. In addition, the third signal indicates the signal caused by the manipulation of the second input device, and may be, for example, a signal caused by the manipulation of moving the mouse, which is the second input device, or a signal caused by the manipulation of inputting an arbitrary button of the keyboard, which is the second input device.

The processor may maintain the operation of the electronic device until the third signal is received if the third signal is not received (S1210—N). On the other hand, the processor may transmit the third signal to the fourth external device for a predetermined second threshold interval (S1220) if the third signal is received (S1210—Y).

In detail, the processor may control the fifth communication interface among the plurality of communication interfaces to transmit the third signal to the fourth external device for the predetermined second threshold interval if the third signal caused by the manipulation of the second input device is received from the second input device through the fourth communication interface while the fourth external device is operated in the sleep state. Accordingly, the third signal may be transmitted to the fourth external device through the electronic device. For example, the second threshold interval may be a range of 3 to 5 seconds, which may be changed based on the user setting or a developer setting.

Meanwhile, the fifth communication interface refers to the communication interface through which the electronic device and the fourth external device are connected to each other, and may be, for example, the WiFi module or the HDMI module. In addition, the fifth communication interface may maintain its activation state even in the sleep state of the fourth external device in order to receive the signal to activate the fourth external device.

Meanwhile, the processor may control the display to display the first content while the third signal is transmitted to the fourth external device. Here, the first content refers to the content being displayed on the display before the third signal caused by the manipulation of the second input device is received. That is, the processor may transmit the third signal to the fourth external device in the state where no content is displayed on the display (i.e., no signal state), and transmit the third signal to the fourth external device in a state where the first content being displayed on the display is displayed again before the third signal is received.

The processor may receive the first image signal from the fourth external device (S1240) and display third content corresponding to the received first image signal (S1250) if the sleep state of the fourth external device is changed to its activation state within the second threshold interval (S1230—Y). In detail, the processor may identify that the sleep state of the fourth external device is changed to the activation state if a response signal to the third signal is received from the fourth external device through the fifth communication interface as a result of transmitting the third signal to the fourth external device for the second threshold interval. The processor may then receive the first image signal from the fourth external device through the fifth communication interface and control the display to display the third content corresponding to the first image signal.

The processor may control the display to display the first content (S1260) if the sleep state of the fourth external device is not changed to the activation state within the second threshold interval (S1230—N). The processor may then control the operation of the electronic device on the basis of a fourth signal (S1280) if the fourth signal caused by the manipulation of the second input device is received from the second input device (S1270). In detail, the processor may control the operation of the electronic device on the basis of the fourth signal if the fourth signal caused by the manipulation of the second input device is received from the second input device through the fourth communication interface after the second threshold interval.

According to the conventional technology, if the electronic device is a display device such as a TV or a monitor and the fourth external device is a device such as a PC, for example, only the content/screen provided by the fourth external device may be provided to the second input device on the basis of the second input device while the fourth external device provides the content to the electronic device. In addition, if the fourth external device is in the sleep state, the operation of the electronic device may only be controlled on the basis of the second input device, and the operation of the fourth external device is unable to be controlled.

On the other hand, the electronic device according to the present disclosure may attempt to activate the fourth external device by first transmitting the third signal to the fourth external device while the fourth external device is operated in the sleep state. In addition, if the fourth external device is not activated for the threshold interval despite this attempt, the electronic device may perform its operation that matches the user intention by controlling the content/screen provided by the electronic device on the basis of the second input device.

Figure 13:
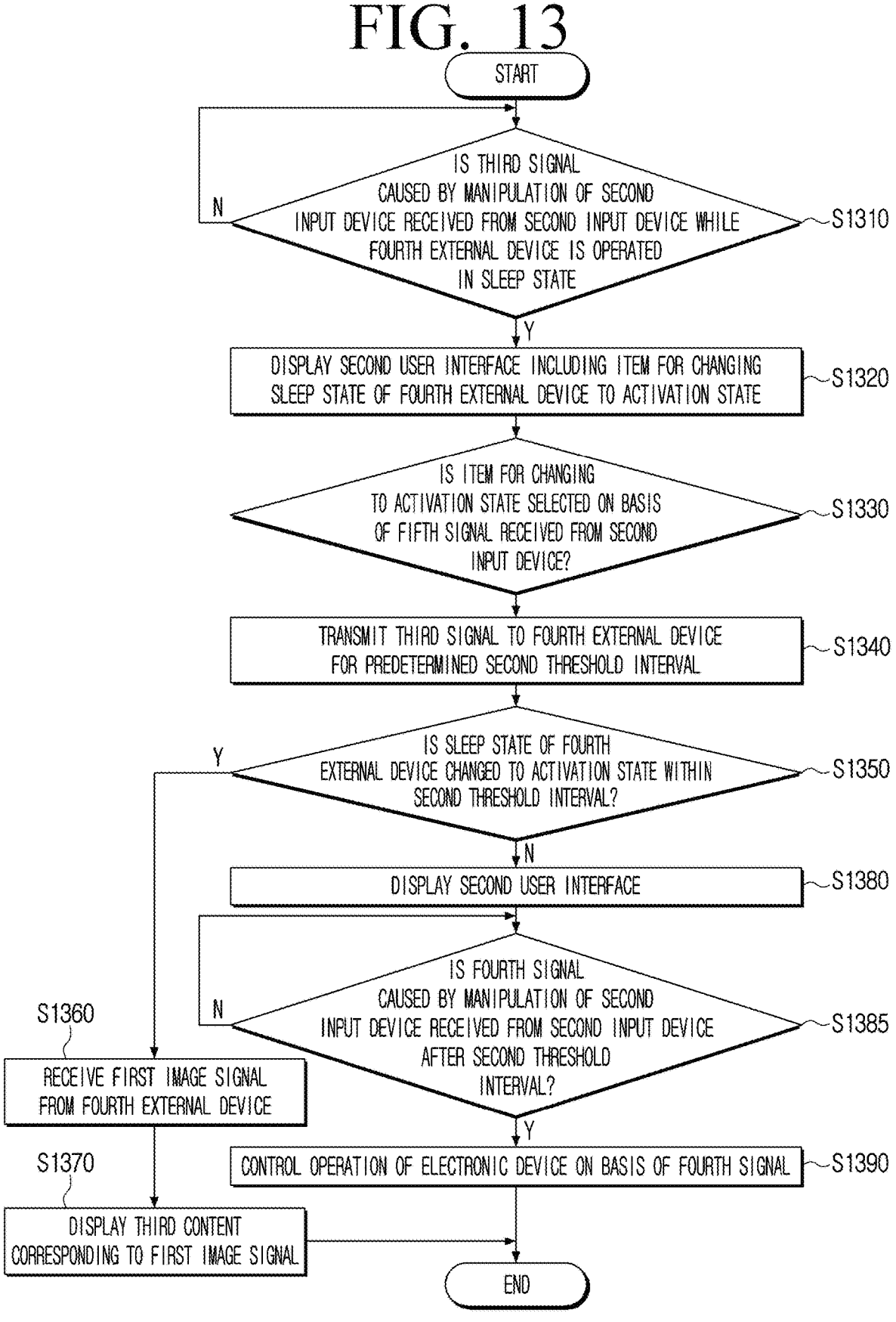
FIG. 13 is a flowchart for describing an embodiment related to providing a second user interface.
Figure 14:
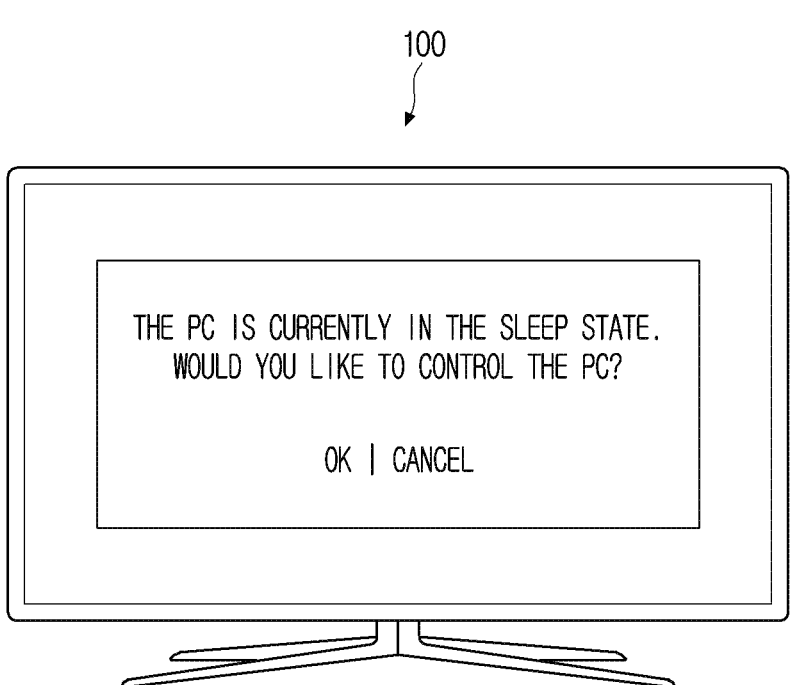
FIG. 14 is a diagram exemplarily showing the second user interface according to an embodiment of the present disclosure.

FIG. 13 is a flowchart for describing an embodiment related to providing a second user interface, and FIG. 14 is a diagram exemplarily showing the second user interface according to an embodiment of the present disclosure.

Referring to FIG. 12, the description describes the embodiment related to first transmitting the third signal caused by the manipulation of the second input device to the fourth external device while the fourth external device is operated in the sleep state, and referring to FIG. 13, the description describes the embodiment related to providing the user interface on the basis of the third signal caused by the manipulation of the second input device.

Referring to FIG. 13, the processor may receive the third signal caused by the manipulation of the second input device from the second input device while the fourth external device is operated in the sleep state (S1310). In detail, the processor may receive the third signal caused by the manipulation of the second input device from the second input device through the fourth communication interface while the fourth external device is operated in the sleep state. The fourth external device, the second input device, and the third signal are defined in the description provided with reference to FIG. 12, and redundant descriptions of the same content are thus omitted.

The processor may maintain the operation of the electronic device until the third signal is received if the third signal is not received (S1310—N). On the other hand, the electronic device may display the second user interface including an item for changing the sleep state of the fourth external device to the activation state (S1320) if the third signal is received (S1310—Y).

In detail, the processor may control the display to display the second user interface including the item for changing the sleep state of the fourth external device to the activation state if the third signal caused by the manipulation of the second input device is received from the second input device through the fourth communication interface. That is, the processor may receive the second user interface for receiving the user input rather than immediately transmitting the third signal to the fourth external device in response to receiving the third signal caused by the manipulation of the second input device while the fourth external device is operated in the sleep state.

The processor may transmit the third signal to the fourth external device for the predetermined second threshold interval (S1350) if the item for changing to the activation state is selected on the basis of a fifth signal received from the second input device (S1340—Y). In detail, the processor may control the fifth communication interface among the plurality of communication interfaces to transmit the third signal to the fourth external device for the predetermined second threshold interval if the item for changing the sleep state of the fourth external device to the activation state is selected through the second user interface on the basis of the fifth signal received from the second input device.

Referring to an example shown in FIG. 14, the second user interface may include the items "OK" and "CANCEL" for receiving the user input together with a guidance message, such as "The PC is currently in the sleep state. Would you like to control the PC?". Here, the processor may transmit the third signal to the fourth external device for the second threshold interval if the item "OK" is selected on the basis of the fifth signal received from the second input device. On the other hand, the electronic device may maintain the operation of the electronic device without transmitting the third signal to the fourth external device if the item "CANCEL" is selected.

The processor may receive the first image signal from the fourth external device (S1360) and display the third content corresponding to the received first image signal (S1370) if the sleep state of the fourth external device is changed to the activation state within the second threshold interval (S1350—Y).

The processor may control the display to display the second user interface again (S1380) if the sleep state of the fourth external device is not changed to the activation state within the second threshold interval (S1350—N). The processor may then control the operation of the electronic device on the basis of the fourth signal (S1390) if the fourth signal caused by the manipulation of the second input device is received from the second input device (S1385).

In other words, the electronic device may first provide the second user interface, and then determine whether to control the content/screen provided by the fourth external device on the basis of the second input device or to control the content/screen provided by the electronic device, based on the user selection, if the third signal caused by the manipulation of the second input device is received while the fourth external device is operated in the sleep state.

The embodiments described above with reference to FIGS. 12 to 14 assume that the external device for providing the content is unable to be changed to the fourth external device, as in the embodiment described above with reference to FIG. 2 or the like, while the fourth external device is operated in the sleep state, which differs from the case where the fourth external device is operated in the activation state. According to the embodiments described above with reference to FIGS. 12 to 14, if the second input device is manipulated while the fourth external device is operated in the sleep state, the electronic device may first transmit the third signal to the fourth external device to thus attempt the activation of the fourth external device, or first provide the second user interface by the electronic device and then transmit the third signal to the fourth external device based on the user intention to thus attempt the activation of the fourth external device, thereby determining the content to be controlled through the second input device.

Figure 15:
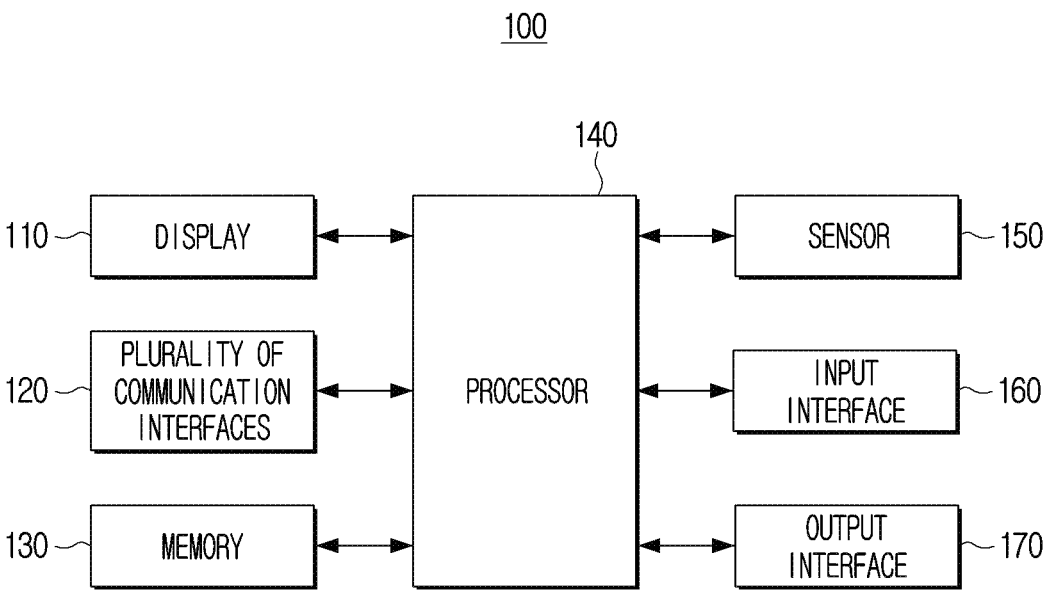
FIG. 15 is a block diagram showing a detailed configuration of the electronic device according to an embodiment of the present disclosure.

FIG. 15 is a block diagram showing a detailed configuration of the electronic device according to an embodiment of the present disclosure.

As shown in FIG. 15, the electronic device 100 according to an embodiment of the present disclosure may further include a sensor 150, an input interface 160, and an output interface 170 in addition to the display 110, the plurality of communication interfaces 120, the memory 130, and the processor 140. However, the configurations shown in FIG. 15 are only examples, and a new component may be added to the configurations shown in FIG. 15 and or some components may be omitted to practice the present disclosure.

The sensor 150 may detect various information inside and outside the electronic device 100. In detail, the sensor 150 may include at least one of the image sensor 150, the global positioning system (GPS) sensor 150, the gyro sensor (gyroscope) 150, the acceleration sensor (accelerometer) 150, light detection and ranging (LiDAR) sensor 150, the inertial sensor (inertial measurement unit (IMU)) 150, or the motion sensor 150. In addition, the sensor 150 may include various types of sensors 150, such as the temperature sensor 150, the humidity sensor 150, the infrared sensor 150, and the bio sensor 150.

In particular, in the various embodiments according to the present disclosure, the processor 140 may identify the user manipulation of the input device 300 or the movement of the input device 300 by acquiring the image of the input device 300 through the image the sensor 150 (or a camera including the image the sensor 150). In addition, the processor 140 may identify the user manipulation intention for the input device 300 on the basis of the signal received from the input device 300 as well as the user manipulation of the input device 300 or the information on the movement of the input device 300, and identify the external device 200 corresponding to the input device 300 only in a case where the user manipulation intention is identified.

The input device 160 may include a circuit, and the processor 140 may receive a user command for controlling the operation of the electronic device 100 through the input device 160. In detail, the input interface 160 may include a component such as a microphone, a remote control, or a remote control signal receiver (not shown). In addition, the input interface 160 may be implemented as a touch screen included in the display 110.

The microphone may acquire a signal for a sound or voice, generated from outside the electronic device 100. In detail, the microphone may acquire vibration caused by the sound or the voice, generated from outside the electronic device 100 and convert the acquired vibration into an electrical signal.

The microphone according to the present disclosure may acquire a voice signal for a user voice generated by a user speech. In addition, the acquired signal may be converted into a digital signal and stored in the memory 130. The microphone may include an analog to digital (A/D) converter, and also be operated in conjunction with the A/D converter disposed outside the microphone.

In particular, in the various embodiments according to the present disclosure, the processor 140 may receive, through the input interface 160, the user input for setting (designating) the external device 200 corresponding to the input device 300, the user input for setting the application corresponding to the first external device 200, the user input for selecting the UI item included in the user interface or the like. The user input as described above may be received in a form of the voice signal through the microphone. Meanwhile, the user input as described above may be received through the communication interface 120 according to the present disclosure as the user input is input to the input device 300 according to the present disclosure.

The output interface 170 may include a circuit, and the processor 140 may output various functions performed by the electronic device 100 through the output interface 170. In addition, the output interface 170 may include at least one of the display 110, a speaker, or an indicator. The display 110 is described as a separate component from the output interface 170 with reference to FIG. 2, and its redundant description is thus omitted.

The display 110 may output the image data under the control of the processor 140. In detail, the display 110 may output the image pre-stored in the memory 130 under the control of the processor 140. In particular, the display 110 according to an embodiment of the present disclosure may also display the user interface stored in the memory 130. The display 110 may be implemented as a liquid crystal display (LCD) panel, an organic light emitting diode (OLED) panel or the like. In addition, the display 110 may be implemented as a flexible display, a transparent display or the like in some cases. However, the display 110 according to the present disclosure is not limited to any specific type.

The speaker may output audio data under the control of the processor 140, and the indicator may be lit under the control of the processor 140.

In particular, in the various embodiments according to the present disclosure, the processor 140 may output a voice message for confirming whether to change the content displayed on the display 110 through the speaker, and may also output various voice messages related to its operations according to the present disclosure.

Figure 16:
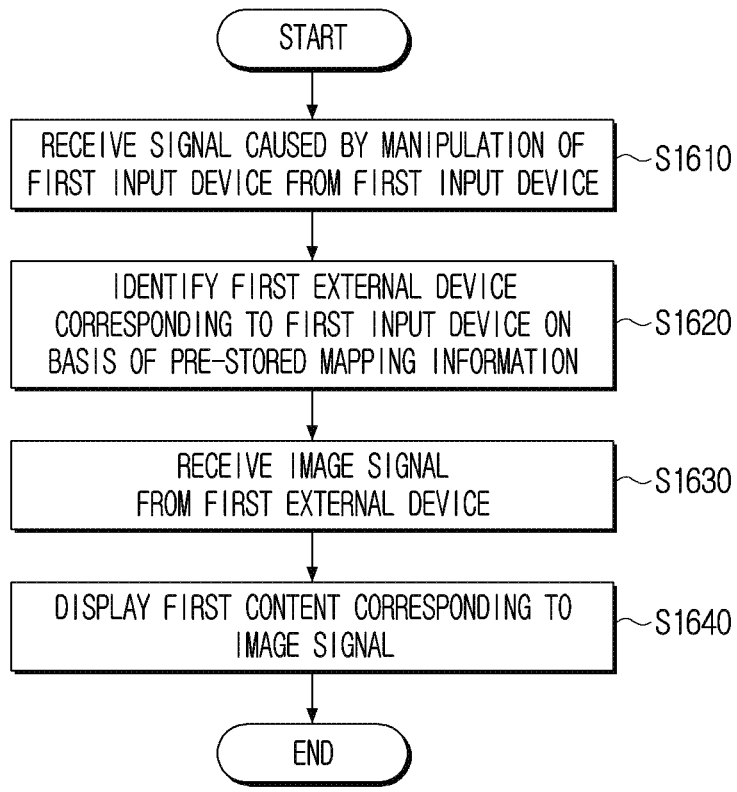
FIG. 16 is a flowchart showing a method for controlling an electronic device according to an embodiment of the present disclosure.

FIG. 16 is a flowchart showing a method for controlling an electronic device 100 according to an embodiment of the present disclosure.

As shown in FIG. 16, the electronic device 100 according to an embodiment of the present disclosure may receive the signal caused by the manipulation of the first input device 300 from the first input device 300 among at least one input device 300 (S1610).

The electronic device 100 may identify the first external device 200 corresponding to the first input device 300 among at least one external device 200 on the basis of the mapping information if the signal caused by the manipulation of the first input device 300 is received (S1620). In an embodiment, the mapping information may be acquired on the basis of the user setting and stored in the memory 130. In addition, the mapping information may be stored in the memory 130 by being acquired on the basis of the history of the signal reception from at least one input device 300 within the threshold time after the signal is received from at least one external device 200.

The electronic device 100 may receive the image signal from the first external device 200 if the first external device 200 corresponding to the first input device 300 is identified (S1630). In addition, the electronic device 100 may control the display 110 to display the first content corresponding to the image signal if the image signal is received from the first external device 200 (S1640).

Meanwhile, the method for controlling an electronic device 100 according to the embodiment described above may be implemented as a program and provided to the electronic device 100. In particular, the program including the method for controlling an electronic device 100 may be stored and provided in a non-transitory computer readable medium.

In detail, provided is the non-transitory computer-readable recording medium including a program for executing a method for controlling an electronic device 100, wherein the method includes: identifying the first external device 200 corresponding to the first input device 300 among at least one external device 200 on the basis of the mapping information indicating the mapping relationship between at least one external device 200 and at least one input device 300 for providing the content if the signal caused by the manipulation of the first input device 300 is received from the first input device 300 among at least one input device 300 for receiving the user input; receiving the image signal from the first external device 200; and displaying the first content corresponding to the image signal.

The description above briefly describes the method for controlling an electronic device 100, and the computer-readable recording medium including a program for executing a method for controlling an electronic device 100, which is only provided for the purpose of omitting their redundant descriptions, the redundant descriptions are thus omitted, and the various embodiments of the electronic device 100 may also be applied to the method for controlling an electronic device 100, and the computer-readable recording medium including a program for executing a method for controlling an electronic device 100.

According to the various embodiments of the present disclosure described above, the electronic device 100 may improve the user convenience by changing the external device 200 for providing the content displayed on the display 110 of the electronic device 100 on the basis of the manipulation of the input device 300 connected to the electronic device 100.

According to the embodiment described above, the electronic device 100 may provide the content that matches the user intention by remotely powering on the external device 200 and then displaying the content provided from the external device 200, or alternatively providing the application corresponding to the content provided from the external device 200 instead of displaying the content even in the state where the external device 200 is not connected to the electronic device 100 or the external device 200 is powered off.

In addition, the electronic device 100 may improve the user convenience by confirming the user intention before switching the screen of the display 110 to display the content provided from the external device 200, and prevent the screen of the display 110 from being switched against the user intention if the input device 300 is mismanipulated. Furthermore, the electronic device 100 may prevent the screen of the display 110 from being switched to thus cause the user inconvenience if the signal received from the external device 200 is the abnormal signal other than the image signal.

A machine-readable storage medium may be provided in the form of a non-transitory storage medium. Here, the "non-transitory storage medium" refers to a tangible device and only indicates that this storage medium does not include a signal (e.g., electromagnetic wave), and this term does not distinguish a case where data is semi-permanently stored in the storage medium and a case where data is temporarily stored in the storage medium from each other. For example, the "non-transitory storage medium" may include a buffer in which data is temporarily stored.

According to an embodiment, the method according to the various embodiments disclosed in this document may be provided by being included in a computer program product. The computer program product may be traded as a product between a seller and a purchaser. The computer program product may be distributed in the form of a machine-readable storage medium (for example, a compact disc read only memory (CD-ROM)), or may be distributed online (for example, downloaded or uploaded) through an application store (for example, PlayStore™) or directly between two user devices (for example, smartphones). In case of the online distribution, at least a part of the computer program product (e.g., downloadable app) may be at least temporarily stored or temporarily provided in the machine-readable storage medium such as the memory 130 included in a server of a manufacturer, a server of an application store, or a relay server.

Each component (e.g., module or program) according to the various embodiments described above may include one entity or a plurality of entities, and some of the corresponding sub-components described above may be omitted or other sub-components may be further included in the various embodiments. Alternatively or additionally, some of the components (e.g., modules or programs) may be integrated into one entity, and may perform functions performed by the respective corresponding components before being integrated in the same or similar manner.

Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

Meanwhile, the term "~er/~or" or "module" used in the present disclosure may include a unit including hardware, software or firmware, and may be used interchangeably with the term, for example, logic, a logic block, a component or a circuit. The "~er/~or" or "module" may be an integrally formed component, or a minimum unit performing one or more functions or a part thereof. For example, the module may include the application-specific integrated circuit (ASIC).

The various embodiments of the present disclosure may be implemented by software including an instruction stored on the machine-readable storage medium (for example, a computer-readable storage medium). A machine may be a device that invokes the stored instruction from the storage medium, may be operated based on the invoked instruction, and may include the electronic device (e.g., electronic device 100) according to the disclosed embodiments.

If the instruction is executed by the processor, the processor may directly perform a function corresponding to the instruction or other components may perform the function corresponding to the instruction under the control of the processor. The instruction may include codes generated or executed by a compiler or an interpreter.

Although the embodiments of the present disclosure are shown and described as above, the present disclosure is not limited to the above-mentioned specific embodiments, and may be variously modified by those skilled in the art to which the present disclosure pertains without departing from the gist of the present disclosure as claimed in the accompanying claims. These modifications should also be understood to fall within the scope and spirit of the present disclosure.

The invention claimed is:

1. An electronic device comprising:
a display;
a plurality of communication interfaces configured to connect at least one external device to provide content and at least one input device to receive a user input to the electronic device;
a memory to store mapping information indicating a mapping relationship between the at least one external device and the at least one input device; and
a processor configured to:
identify the at least one external device as corresponding to the at least one input device based on the mapping information which is stored in the memory according to a signal caused by a manipulation of the at least one input device being received from the at least one input device through a first communication interface among the plurality of communication interfaces,
based on the at least one external device being identified, control a second communication interface among the plurality of communication interfaces to transmit, to the at least one external device, a request for an image signal,
receive the image signal from the at least one external device through the second communication interface among the plurality of communication interfaces in response to the request, and
control the display to display content corresponding to the image signal.

2. The electronic device as claimed in claim 1, wherein the processor is configured to:
identify whether the at least one external device is powered on,
receive the image signal from the at least one external device through the second communication interface among the plurality of communication interfaces based on the at least one external device being identified as being powered on,
control the second communication interface to transmit a control signal, to power on the at least one external device, to the at least one external device based on the at least one external device being identified as being powered off, and receive the image signal from the at least one external device through the second communication interface based on the at least one external device being powered on based on the control signal.

3. The electronic device as claimed in claim 2, wherein the processor is configured to
execute a first application predetermined to correspond to the at least one external device among a plurality of applications provided by the electronic device based on the at least one external device not being powered on based on the control signal, and
control the display to display a screen corresponding to the first application.

4. The electronic device as claimed in claim 3, wherein the processor is configured to control the display to display the screen corresponding to the first application based on the at least one external device being identified as not being connected to the electronic device.

5. The electronic device as claimed in claim 1, wherein the content corresponding to the image signal the display is controlled to display is first content, the at least one external device is a first external device and the processor is configured to:
control the display to display a first user interface to stop display of second content and select whether to display the first content based on the signal caused by the manipulation of the at least one input device being received while the second content provided from a second external device among the at least one external device is displayed on the display, and
control the display to display the first content based on the user input to stop the display of the second content and select to display the first content being received through the first user interface.

6. The electronic device as claimed in claim 1, wherein the processor is configured to
identify whether the signal caused by the manipulation of the at least one input device is received again from the at least one input device within a threshold interval after the signal caused by the manipulation of the at least one input device is received,
control the display to display the content based on the signal caused by the manipulation of the at least one input device is received again within the threshold interval, and
maintain an operation of the display based on the signal caused by the manipulation of the at least one input device is not received again within the threshold interval.

7. The electronic device as claimed in claim 1, wherein the content corresponding to the image signal the display is controlled to display is first content and the processor is configured to:
identify whether a received signal is the image signal based on the signal being received from a third external device among the at least one external device through a third communication interface among the plurality of communication interfaces while the first content is displayed on the display,
control the display to display a second content corresponding to the received signal based on the received signal is the image signal, and
maintain an operation of the display based on the received signal is not the image signal.

8. The electronic device as claimed in claim 1, wherein the mapping information is acquired based on at least one of a user setting or a history of signal reception from the at least one input device within a threshold time after a signal being received from the at least one external device.

9. The electronic device as claimed in claim 1, wherein the processor is configured to control at least one communication interface among the plurality of communication interfaces to transmit a control signal to power off the at least one external device connected to the electronic device to each of the at least one external device based on the user input to power off the electronic device being received.

10. The electronic device as claimed in claim 1, wherein the content corresponding to the image signal the display is controlled to display is first content, the at least one input device is a first input device and the processor is configured to:

control the display to stop an operation of the display based on a first signal corresponding to the user input to power off the electronic device being received from a second input device among the at least one input device through a fourth communication interface among the plurality of communication interfaces while the first content is displayed, control the fourth communication interface to maintain an activation state of the fourth communication interface while the operation of the display is stopped, and control the display to display the first content based on a second signal caused by a manipulation of the second input device being received from the second input device through the fourth communication interface while the operation of the display is stopped.

11. The electronic device as claimed in claim 10, wherein the processor is configured to:

control a fifth communication interface among the plurality of communication interfaces to transmit a third signal to a fourth external device for a threshold interval based on the third signal caused by the manipulation of the second input device being received from the second input device through the fourth communication interface while the fourth external device among the at least one external device is operated in a sleep state, receive a first image signal from the fourth external device through the fifth communication interface, and control the display to display third content corresponding to the first image signal based on the sleep state of the fourth external device being changed to an activation state within the threshold interval, control the display to display the first content based on the sleep state of the fourth external device not being changed to the activation state within the threshold interval, and control an operation of the electronic device based on a fourth signal based on the fourth signal caused by the manipulation of the second input device being received from the second input device through the fourth communication interface after the threshold interval.

12. The electronic device as claimed in claim 11, wherein the processor is configured to control the display to display the first content while the third signal is transmitted to the fourth external device.

13. The electronic device as claimed in claim 10, wherein the processor is configured to:

control the display to display a second user interface including an item to change a sleep state of a fourth external device to the activation state based on a third signal caused by the manipulation of the second input device is received from the second input device through the fourth communication interface while the fourth external device is operated in the sleep state, control a fifth communication interface among the plurality of communication interfaces to transmit the third signal to the fourth external device for a threshold interval based on the item is selected through the fourth communication interface based on a fifth signal received from the second input device, and receive a first image signal from the fourth external device through the fifth communication interface, and control the display to display third content corresponding to the first image signal based on the sleep state of the fourth external device is changed to the activation state within the threshold interval.

14. The electronic device as claimed in claim 13, wherein the processor is configured to control the display to display the second user interface based on the sleep state of the fourth external device is not changed to the activation state within the threshold interval, and control an operation of the electronic device based on a fourth signal based on the fourth signal caused by the manipulation of the second input device is received from the second input device through the fourth communication interface after the threshold interval.

15. A method for controlling an electronic device, the method comprising:

identifying at least one external device as corresponding to a first input device among at least one input device based on mapping information indicating a mapping relationship between the at least one external device to provide content and the at least one input device to receive a user input to the electronic device, the identifying being based on a signal caused by a manipulation of the first input device being received from the first input device;

based on the at least one external device is identified, transmitting, to the at least one external device, a request for an image signal;

receiving the image signal from the at least one external device in response to the request; and displaying content corresponding to the image signal.

* * * * *